US012800989B2

(12) United States Patent
Takanashi

(10) Patent No.: US 12,800,989 B2
(45) Date of Patent: Nov. 17, 2026

(54) ACCESSORY DETACHABLY MOUNTED BETWEEN AN INTERCHANGEABLE LENS AND AN IMAGE PICKUP APPARATUS THAT CHANGES A COMMUNICATION PROCESSING METHOD BASED ON APERTURE CONTROL INFORMATION AND ITS CONTROL METHOD

(71) Applicant: CANON KABUSHIKI KAISHA, Tokyo (JP)

(72) Inventor: Hideya Takanashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 134 days.

(21) Appl. No.: 18/905,472

(22) Filed: Oct. 3, 2024

(65) Prior Publication Data

US 2025/0138392 A1 May 1, 2025

(30) Foreign Application Priority Data

Oct. 27, 2023 (JP) ................................ 2023-184395

(51) Int. Cl.

| | |
|---|---|
| ***H04N 5/335*** | (2011.01) |
| ***G03B 7/20*** | (2021.01) |
| ***G03B 9/02*** | (2021.01) |
| ***G03B 17/56*** | (2021.01) |
| *G02B 7/14* | (2021.01) |
| *G03B 17/14* | (2021.01) |

(52) U.S. Cl.
CPC ................. *G03B 7/20* (2013.01); *G03B 9/02* (2013.01); *G03B 17/565* (2013.01); *G02B 7/14* (2013.01); *G03B 17/14* (2013.01)

(58) Field of Classification Search
CPC .................................... G03B 7/14; G03B 7/20
See application file for complete search history.

(56) References Cited

U.S. PATENT DOCUMENTS

| | | | | |
|---|---|---|---|---|
| 11,689,802 B2 * | 6/2023 | Sugita | .................... | H04N 23/66 348/211.99 |
| 12,645,134 B2 * | 6/2026 | Takanashi | ............ | G03B 17/565 |
| 2021/0067682 A1 * | 3/2021 | Sugita | .................... | G03B 17/14 |

FOREIGN PATENT DOCUMENTS

| | | |
|---|---|---|
| JP | 2012247578 A | 12/2012 |
| JP | 2020030295 A | 2/2020 |

* cited by examiner

*Primary Examiner* — Gary C Vieaux
(74) *Attorney, Agent, or Firm* — Cowan, Liebowitz & Latman, P.C.

(57) ABSTRACT

An accessory is detachably mounted between an interchangeable lens and an image pickup apparatus. The accessory includes a first aperture unit configured to adjust a light amount incident from the interchangeable lens, a communication unit configured to communicate with each of the interchangeable lens and the image pickup apparatus, and a processor configured to control the first aperture unit, and change a communication processing method with the interchangeable lens or the image pickup apparatus according to whether or not received information received via the communication unit is information regarding aperture control.

20 Claims, 23 Drawing Sheets

411: MANUAL APERTURE RING
412: LENS-SIDE COMMUNICATION TERMINAL
413: CAMERA-SIDE COMMUNICATION TERMINAL

411: MANUAL APERTURE RING
412: LENS-SIDE COMMUNICATION TERMINAL
413: CAMERA-SIDE COMMUNICATION TERMINAL
1201: OPERATION RING
1202: INDEX
1203: MARK

EXTERNAL VIEW

EXTERNAL VIEW

MOVING IMAGE CAPTURING MODE

ACCESSORY DETACHABLY MOUNTED BETWEEN AN INTERCHANGEABLE LENS AND AN IMAGE PICKUP APPARATUS THAT CHANGES A COMMUNICATION PROCESSING METHOD BASED ON APERTURE CONTROL INFORMATION AND ITS CONTROL METHOD

BACKGROUND

Technical Field

The present disclosure relates to an accessory and its control method.

Description of Related Art

In a lens interchangeable type camera system, an accessory attachable between a camera body (image pickup apparatus) and an interchangeable lens has conventionally been proposed to expand the functions. Japanese Patent Laid-Open No. 2020-30295 discloses an accessory attachable between an interchangeable lens and a camera body, and configured to control an aperture stop (diaphragm) in the interchangeable lens in a case where a manual ring operation by a user is accepted. Japanese Patent Laid-Open No. 2012-247578 discloses an accessory attachable between an interchangeable lens and a camera body, and configured to distribute a focus drive request from the camera body between processing of the focus drive unit of the interchangeable lens and processing of the focus drive unit of the accessory.

The accessory disclosed in Japanese Patent Laid-Open No. 2020-30295 is based on the premise that the aperture mechanism of the interchangeable lens is used, and therefore does not work with an interchangeable lens whose aperture mechanism cannot be electrically controlled via a mount unit. The accessory disclosed in Japanese Patent Laid-Open No. 2020-30295 also uses the aperture mechanism in the interchangeable lens. Thus, in a case where an interchangeable lens with low noise or low control resolution, or one that does not provide a sufficient image degradation effect, is attached, it may not be possible to provide the aperture function desired by the user.

The accessory disclosed in Japanese Patent Laid-Open No. 2012-247578 performs focus control on the premise that both the interchangeable lens and the accessory include a drive member for focus drive. For example, in a case where the interchangeable lens does not have an aperture drive member or does not have a communication function, processing cannot be performed.

SUMMARY

An accessory according to one aspect of the disclosure is detachably mounted between an interchangeable lens and an image pickup apparatus. The accessory includes a first aperture unit configured to adjust a light amount incident from the interchangeable lens, a communication unit configured to communicate with each of the interchangeable lens and the image pickup apparatus, and a processor configured to control the first aperture unit, and change a communication processing method with the interchangeable lens or the image pickup apparatus according to whether or not received information received via the communication unit is information regarding aperture control.

Further features of various embodiments of the disclosure will become apparent from the following description of embodiments with reference to the attached drawings.

DETAILED DESCRIPTION

Figure 1:
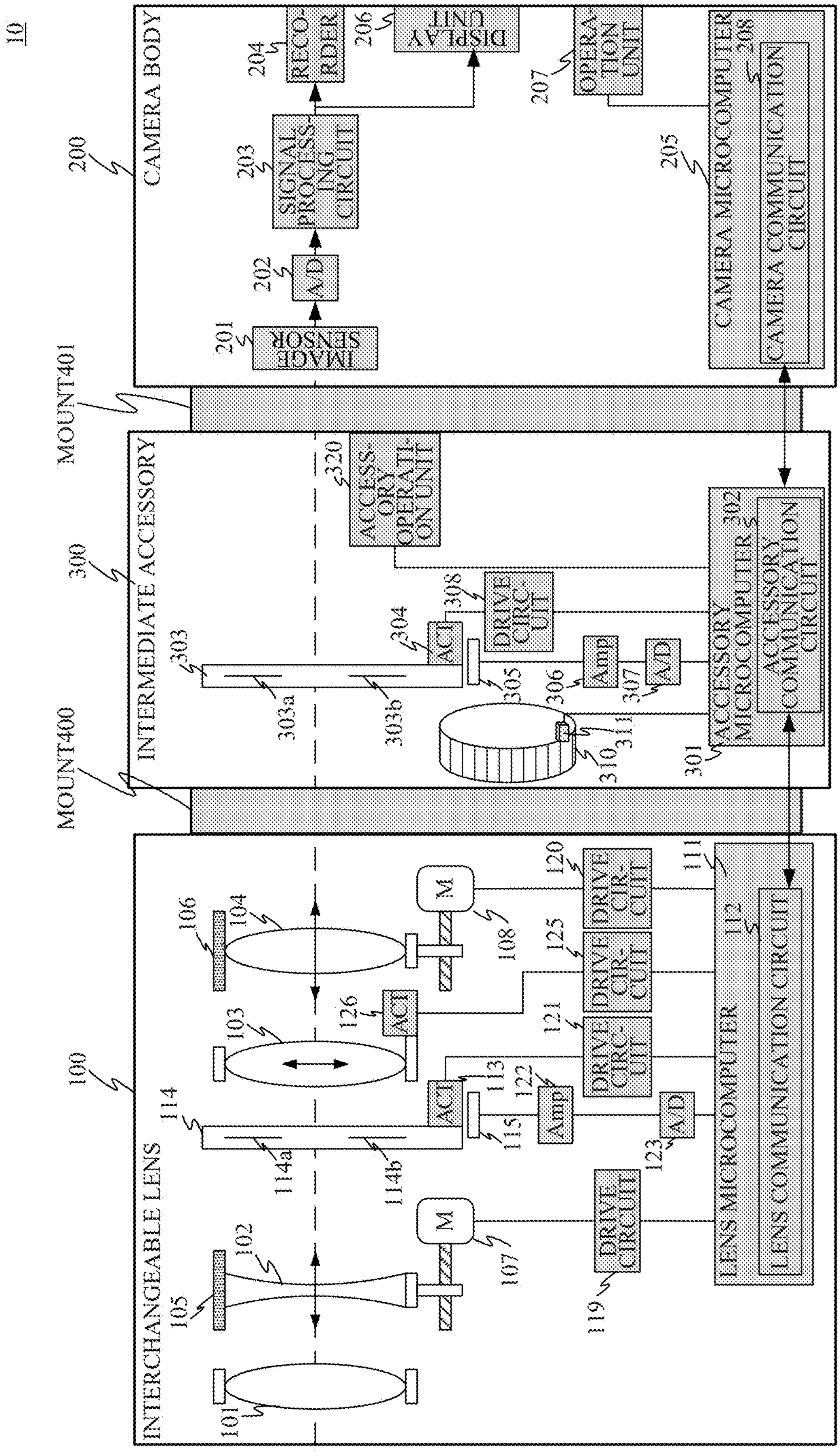
FIG. 1 is a block diagram of an imaging system according to first and second embodiments.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure. Corresponding elements in respective figures will be designated by the same reference numerals, and a duplicate description thereof will be omitted.

First Embodiment

Configuration of Camera System

Referring now to FIG. 1, a description will be given of a camera system (imaging system) 10 according to a first embodiment of the present disclosure. FIG. 1 is a block diagram of the camera system 10. The camera system 10 includes an interchangeable lens 100, a camera body (image pickup apparatus) 200, and an intermediate accessory (accessory) 300 detachably mounted between the camera body 200 and the interchangeable lens 100. The camera body 200 can be used while the interchangeable lens 100 and the intermediate accessory 300 are attached to each other. In this embodiment, the intermediate accessory 300 includes a single accessory, but may include a plurality of accessories.

In this embodiment, communication is performed among the interchangeable lens 100, the camera body 200, and the intermediate accessory 300. The interchangeable lens 100, the camera body 200, and the intermediate accessory 300 transmit a control command and data (information) via their respective lens communication circuits (communication units) 112, 208, and 302.

A description will now be given of the specific configurations of the interchangeable lens 100, the camera body 200, and the intermediate accessory 300. The interchangeable lens 100 and the intermediate accessory 300 are mechanically and electrically connected via a mount 400. The mount 400 is illustrated as a schematic representation of a state in which a mount provided on the interchangeable lens 100 and a mount provided on the intermediate accessory 300 are joined together. The camera body 200 and the intermediate accessory 300 are mechanically and electrically connected via a mount 401. The mount 401 is illustrated as a schematic representation of a state in which a mount provided on the camera body 200 and a mount provided on the intermediate accessory 300 are joined together. A communication terminal is provided on the mount surface of each of the mounts provided on the interchangeable lens 100, the camera body 200, and the intermediate accessory 300. In a case where each unit is connected via the mounts, the corresponding communication terminals come into contact with each other, and communications are activated via the communication terminals.

The interchangeable lens 100 receives power from the camera body 200 via unillustrated power terminals provided on the mounts 400 and 401, and supplies power to various actuators, which will be described later, and a lens microcomputer (lens microcomputer) 111. The intermediate accessory 300 receives power from the camera body 200 via an unillustrated power terminal provided on the mount 401, and supplies power to an accessory microcomputer (control unit (accessory microcomputer)) 301.

A description will now be given of the configuration of the interchangeable lens 100. The interchangeable lens 100 includes an imaging optical system. The imaging optical system includes, in order from the object side to the image side, a field lens 101, a zoom lens 102 configured to provide magnification variation, an aperture unit 114 configured to adjust a light amount, an image stabilizing lens 103, and a focus lens 104 configured to provide focusing.

The zoom lens 102 and focus lens 104 are held by lens holding frames 105 and 106, respectively. Stepping motors 107 and 108 drive the lens holding frames 105 and 106 along the optical axis of the imaging optical system, which is indicated by a dashed line, in synchronization with a drive pulse. The image stabilizing lens 103 reduces image blur caused by camera shake (handheld shake) or the like by moving in a direction that has a component perpendicular to the optical axis of the imaging optical system.

The lens microcomputer 111 controls the operation of each part in the interchangeable lens 100. The lens microcomputer 111 receives a control command and a transmission request command transmitted from the camera body 200 or the intermediate accessory 300 via the lens communication circuit 112. The lens microcomputer 111 performs lens control corresponding to the control command, and transmits lens data corresponding to the transmission request command to the camera body 200 or the intermediate accessory 300 via the lens communication circuit 112. For example, the lens microcomputer 111 drives the stepping motors 107 and 108 by outputting drive signals to the zoom drive circuit 119 and the focus drive circuit 120 in response to a command relating to the magnification variation and focusing among the control commands. Thereby, zoom processing to control the magnification varying operation by the zoom lens 102 and autofocus (AF) processing to control the focusing operation by the focus lens 104 can be performed.

The aperture unit (second aperture unit) 114 is an aperture stop unit having aperture blades **114*a* and 114*b*. A Hall element 115 detects the states (positions) of the aperture blades 114*a* and 114*b*. The detection result by the Hall element 115 is input to the lens microcomputer 111 via an amplifier circuit 122 and an A/D conversion circuit 123. The lens microcomputer 111 outputs a drive signal to an aperture drive circuit 121 based on the input signal from the A/D conversion circuit 123 to drive an aperture actuator 113. Thereby, the light amount operation by the aperture unit 114 is performed. The drive method of the aperture actuator 113** is not limited and any known method may be used.

The lens microcomputer 111 drives an image stabilizing actuator 126 such as a voice coil motor via an image stabilizing drive circuit 125 according to shakes detected by an unillustrated vibration sensor such as a vibration gyroscope provided in the interchangeable lens 100. Thereby, image stabilizing processing for controlling a shift operation (image stabilizing operation) of the image stabilizing lens 103 is performed.

A description will now be given of the configuration of the intermediate accessory 300. The intermediate accessory 300 includes an accessory microcomputer 301, which controls various members included in the intermediate accessory.

The accessory microcomputer 301 receives a control command and a transmission request command transmitted from the camera body 200 via an accessory communication circuit 302. The accessory microcomputer 301 performs accessory control in response to the control command, or transmits a control command to the interchangeable lens 100 via the accessory communication circuit 302. Then, as a result of performing the accessory control, or based on information received from the interchangeable lens 100 via the accessory communication circuit 302, a response corresponding to the transmission request command received from the camera body 200 is transmitted to the camera body 200. The accessory microcomputer 301 does not necessarily transmit a transmission request command to the interchangeable lens 100 via the accessory communication circuit 302 only in response to a communication request from the camera body 200. For example, in a case where an accessory operation ring (operation member) 310 (described later) or the like is operated, a communication request is transmitted to the interchangeable lens 100 via the accessory communication circuit 302, as necessary.

The intermediate accessory 300 further includes a manual ring operation ring (so-called electronic ring) 310 that can be rotated by the user, and a ring rotation detector 311. The ring rotation detector 311 includes, for example, a photo-interrupter that outputs a two-phase signal in response to the rotation of the manual aperture operation ring 310. The accessory microcomputer 301 can detect a rotation amount (including a direction) of the manual aperture operation ring 310 using the two-phase signal.

The intermediate accessory 300 further includes an accessory operation unit 320 other than the manual aperture operation ring 310. The accessory operation unit 320 includes, for example, a switch, a button, a touch panel, or the like, and may include a plurality of operation members.

The intermediate accessory 300 further includes an accessory aperture unit (first aperture unit) 303 configured to adjust a light amount incident from the interchangeable lens 100. The accessory aperture unit 303 is an aperture stop unit having aperture blades **303*a* and 303*b*. A Hall element 305 detects the state (position) of the aperture blades 303*a* and 303*b*. The detection result by the Hall element 305 is input to the accessory microcomputer 301 via an amplifier circuit 306 and an A/D conversion circuit 307. The accessory microcomputer 301 outputs a drive signal to an aperture drive circuit 308 based on an input signal from the A/D conversion circuit 307 to drive the aperture actuator 304. Thereby, the light amount adjustment by the accessory aperture unit 303 is performed. The drive method of the aperture actuator 304 is not limited, and any known method may be used. This embodiment controls the accessory aperture unit 303 to operate in conjunction with a user operation of a manual aperture operation ring 310, but the intermediate accessory 300 does not necessarily have to include the manual aperture operation ring 310. For example, manual ring operation information may be transmitted from the camera body 200 or the interchangeable lens 100 via the accessory communication circuit 302**.

The intermediate accessory 300 may have, for example, a function of an extender configured to change a focal length, a wide converter configured to change a focal length, or a mount converter configured to change a flange back length.

A description will now be given of the configuration of the camera body 200. The camera body 200 includes an image sensor 201 such as a CCD sensor or CMOS sensor, an A/D conversion circuit 202, a signal processing circuit 203, a recorder 204, a camera microcomputer (camera microcomputer) 205, and a display unit 206.

The image sensor 201 performs photoelectric conversion for an object image formed by the imaging optical system in the interchangeable lens 100 and outputs an electrical signal (analog signal). The A/D conversion circuit 202 converts the analog signal from the image sensor 201 into a digital signal. The signal processing circuit 203 performs various image processing for the digital signal from the A/D conversion circuit 202 to generate a video signal.

The signal processing circuit 203 also generates from the video signal a contrast state of an object image, that is, focus information on a focus state of the imaging optical system, and luminance information on an exposure state. The signal processing circuit 203 outputs the video signal to the display unit 206, which displays the video signal as a live-view image that is used to check the composition, focus state, etc.

The camera microcomputer 205 controls the camera body 200 according to input from an operation unit 207, such as an image capture instruction switch and various setting switches. The camera microcomputer 205 transmits a control command and a transmission request command to the interchangeable lens 100 or intermediate accessory 300 via the camera communication circuit 208, and receives lens data or accessory data from the interchangeable lens 100 or intermediate accessory 300. For example, the camera microcomputer 205 generates focus shift information in the signal processing circuit 203 based on information regarding an optical characteristic, such as aperture diameter information, received from the interchangeable lens 100 or intermediate accessory 300 via the camera communication circuit 208. Then, based on the generated focus shift information, it generates focus information and transmits a control command relating to focusing operation to the interchangeable lens 100. For example, the camera microcomputer 205 transmits a transmission request command to the interchangeable lens 100 to obtain lens data relating to a focusing operation, and receives lens data relating to a focusing operation from the interchangeable lens 100.

Figure 2:
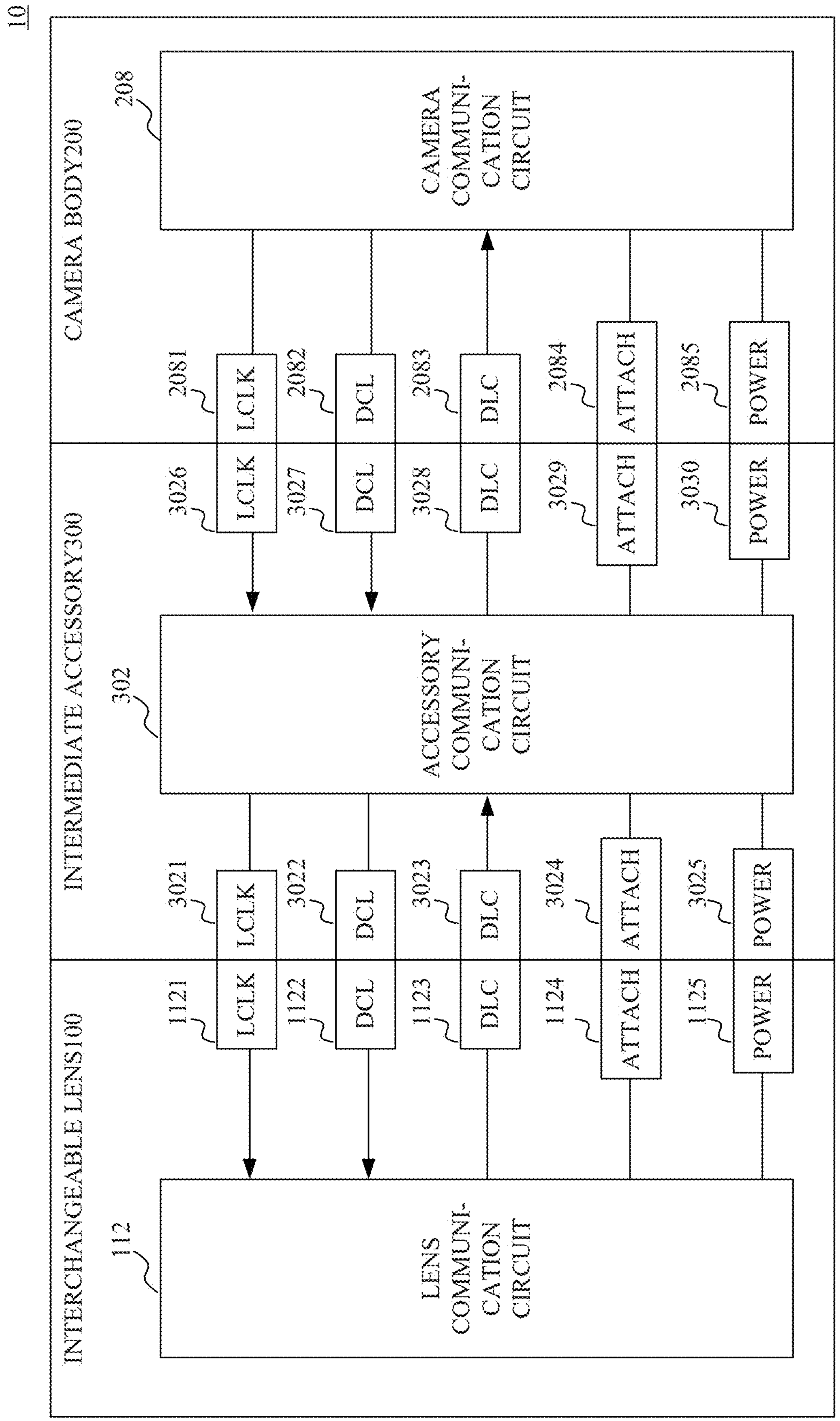
FIG. 2 explains each communication unit in a camera body, an intermediate accessory, and an interchangeable lens in the first to fourth embodiments.

Referring now to FIG. 2, a description will be given of the communication units of the camera body 200, intermediate accessory 300, and interchangeable lens 100. FIG. 2 explains the lens communication circuit 112, accessory communication circuit 302, and camera communication circuit 208.

The mount 400 provided between the interchangeable lens 100 and intermediate accessory 300 has various communication terminals. The interchangeable lens 100 has communication terminals (LCLK 1121, DCL 1122, DLC 1123, ATTACH 1124, POWER 1125). The intermediate accessory 300 has communication terminals (LCLK 3021, DCL 3022, DLC 3023, ATTACH 3024, POWER 3025). The intermediate accessory 300 can determine the attachment state of the interchangeable lens 100 by the ATTACH signal 3024, and supplies power through POWER 3025. Communication is available using other communication terminals.

Similarly, various communication terminals are provided on the mount 401 that is disposed between the intermediate accessory 300 and the camera body 200. The intermediate accessory 300 has communication terminals (LCLK 3026, DCL 3027, DLC 3028, ATTACH 3029, POWER 3030). The camera body 200 has communication terminals (LCLK 2081, DCL 2082, DLC 2083, ATTACH 2084, POWER 2085). The camera body 200 can determine the attachment state of the intermediate accessory 300 by the ATTACH signal 2084, and supplies power through POWER 2085. Communication is available using other communication terminals. The ATTACH signal 2084 is configured to be in a signal state of an attached state while the interchangeable lens 100 is attached to the intermediate accessory 300 (the ATTACH signal 3024 indicates the attached state) and the intermediate accessory 300 is attached to the camera body 200.

Figure 3A:
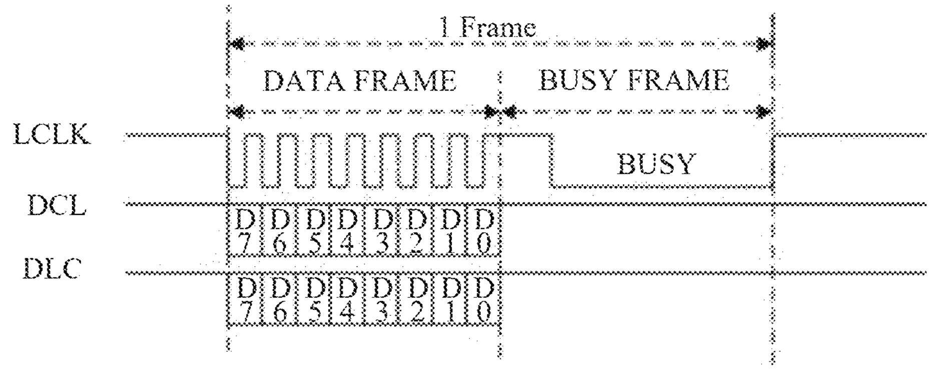
FIGS. 3A, 3B, and 3C explain an example of a communication protocol implemented among the camera body, intermediate accessory, and interchangeable lens in each embodiment.
Figure 3B:
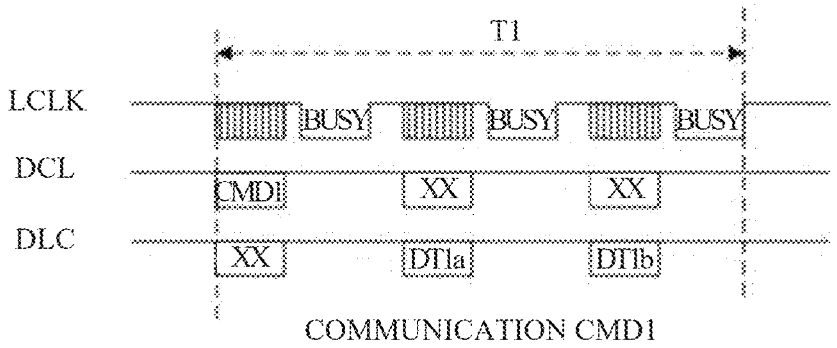
Figure 3C:
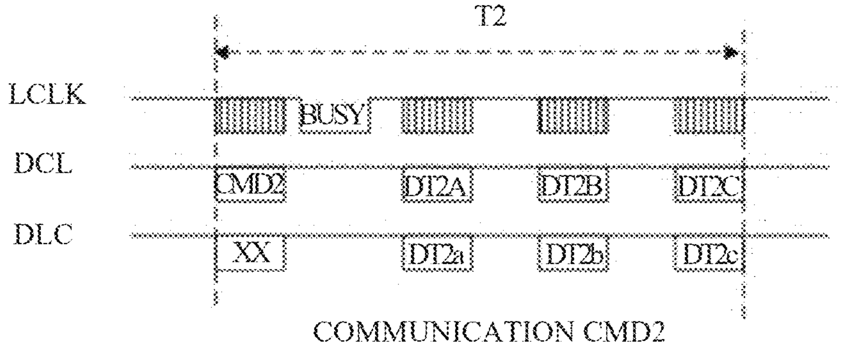

Referring now to FIGS. 3A, 3B, and 3C, a description will be given of an example of a communication method performed using each terminal between the interchangeable lens 100 and the intermediate accessory 300, and between the intermediate accessory 300 and the camera body 200. FIGS. 3A, 3B, and 3C explain an example of a protocol for communication performed among the camera body 200, the intermediate accessory 300, and the interchangeable lens 100.

This communication is performed using a three-wire clock synchronous serial communication method, and is a communication method performed between a device acting as a main communication component that transmits a control command and a data transmission request command, and a device acting as a sub communication component that transmits data in response to a data transmission request command. In the communication processing performed between the camera body 200 and the intermediate accessory 300, the camera communication circuit 208 serves as a main communication component and the accessory communication circuit 302 serves as a sub communication component. In the communication processing performed between the intermediate accessory 300 and the interchangeable lens 100, the accessory communication circuit 302 serves as a main communication component and the lens communication circuit 112 serves as a sub communication component.

The clock signal LCLK is mainly used as a data synchronization clock signal from the main communication component to the sub communication component. The communication signal DCL is used to transmit data such as a control command and a data transmission request command from the main communication component to the sub communication component. The data signal DLC is used to transmit data from the sub communication component to the main communication component.

The main communication component and the sub communication component communicate using a full duplex communication method in which they transmit and receive data to and from each other and simultaneously in synchronization with the common clock signal LCLK.

FIG. 3A illustrates a waveform of a communication signal for one frame, which is the minimum communication unit. First, the main communication component transmits the clock signal LCLK, which has a set of eight-cycle pulses, and also transmits the communication signal DCL to the sub communication component in synchronization with the clock signal LCLK. At the same time, the main communication component receives a data signal DLC output from the sub communication component in synchronization with the clock signal LCLK. In this way, one-byte (8-bit) data is transmitted and received between the main communication component and the sub communication component in synchronization with a pair of clock signals LCLK. A period during which one-byte data is transmitted and received will be referred to as a data frame. After the data frame, a communication pause period is inserted by communication standby request information (simply referred to as a communication standby request hereinafter) BUSY notified from the sub communication component to the main communication component. The communication pause period will be referred to as a BUSY frame. A communication unit consisting of a set of a data frame and a BUSY frame will be referred to as one frame.

FIG. 3B illustrates a waveform of a communication signal consisting of three frames, in which the main communication component transmits a command CMD1 to the sub communication component and receives two-byte data DT1*a* and DT1*b* in response to it. Between the main communication component and sub communication component, the type and number of bytes of data DT corresponding to each command CMD are previously determined.

In the first frame, the main communication component transmits the clock signal LCLK, and transmits the command CMD1 corresponding to the data DT1*a* and DT1*b* for requesting transmission, as a communication signal DCL. The data signal DLC in this frame is treated as invalid data.

Next, the main communication component outputs the clock signal LCLK for eight cycles, and then switches the communication terminal state on the main communication component side from an output format to an input format. After the sub communication component has completed switching of the communication terminal state on the main communication component side, it switches the communication terminal state on the sub communication component side from the input format to the output format. The sub communication component then sets the signal level of the clock signal LCLK to a low level (LOW) in order to notify the main communication component of the communication standby request BUSY. The main communication component maintains the communication terminal state in the input format while the communication standby request BUSY is being notified, and suspends communication to the sub communication component.

The sub communication component generates the data DT1*a* corresponding to the command CMD1 during the notification period of the communication standby request BUSY. After the transmission preparation of the next frame of the data signal DLC is completed, the sub communication component sets the signal level of the clock signal LCLK to a high level (HIGH) to notify the main communication component that the communication standby request BUSY has been cleared. In a case where the main communication component recognizes that the communication standby request BUSY has been cleared, it receives data DT1*a* from the sub communication component by sending a one-frame clock signal LCLK to the sub communication component. Next, the main communication component similarly receives the data DT1*b*.

FIG. 3C illustrates that the main communication component transmits the command CMD2 to the sub communication component to request to acquire communication data, and DT2A, DT2B, and DT2C are transmitted from the camera body 200 to the interchangeable lens 100. Then, the interchangeable lens 100 transmits the corresponding 3-byte lens data DT2*a*, DT2*b*, and DT2*c* to the camera body 200, and a waveform of a 4-frame communication signal is illustrated. In the first frame, the sub communication component notifies the main communication component of the communication standby request BUSY, but in the second to fourth frames, it does not notify the main communication component of the communication standby request BUSY. Therefore, an interval between frames can be reduced. On the other hand, in this communication method, the sub communication component cannot notify the main communication component of the communication standby request BUSY. Therefore, it is necessary to create information to respond to the main communication component during the communication standby request BUSY after the command CMD2 received in the first frame, or to prepare information to respond to the main communication component before this communication is performed.

Figure 4A:
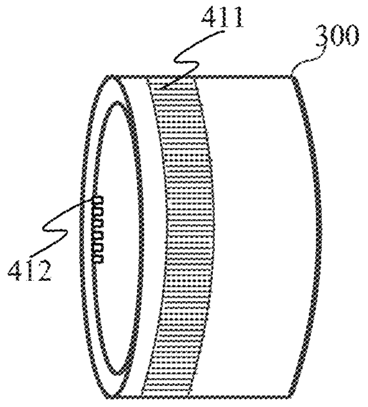
FIGS. 4A and 4B are external views of the intermediate accessory according to the first to fourth embodiments.
Figure 4B:
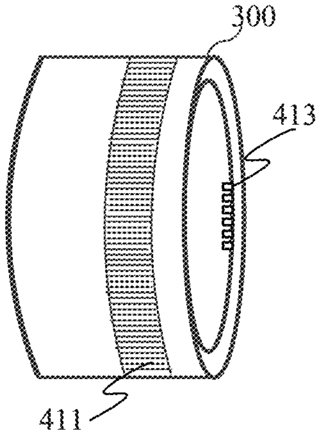

Referring now to FIGS. 4A and 4B, a description will be given of the external appearance of the intermediate accessory 300 according to this embodiment. FIGS. 4A and 4B are external views of the intermediate accessory 300. The manual aperture ring (electronic ring) 411 corresponds to the manual aperture operation ring 310. FIG. 4A illustrates the inside of the mount on the interchangeable lens 100 side, and reference numeral 412 denotes a lens-side communication terminal, which corresponds to 3021 to 3025 in FIG. 2. FIG. 4B illustrates the inside of the mount on the camera body 200 side, and reference numeral 413 denotes a camera-side communication terminal, which corresponds to 3026 to 3030 in FIG. 2.

Figure 5:
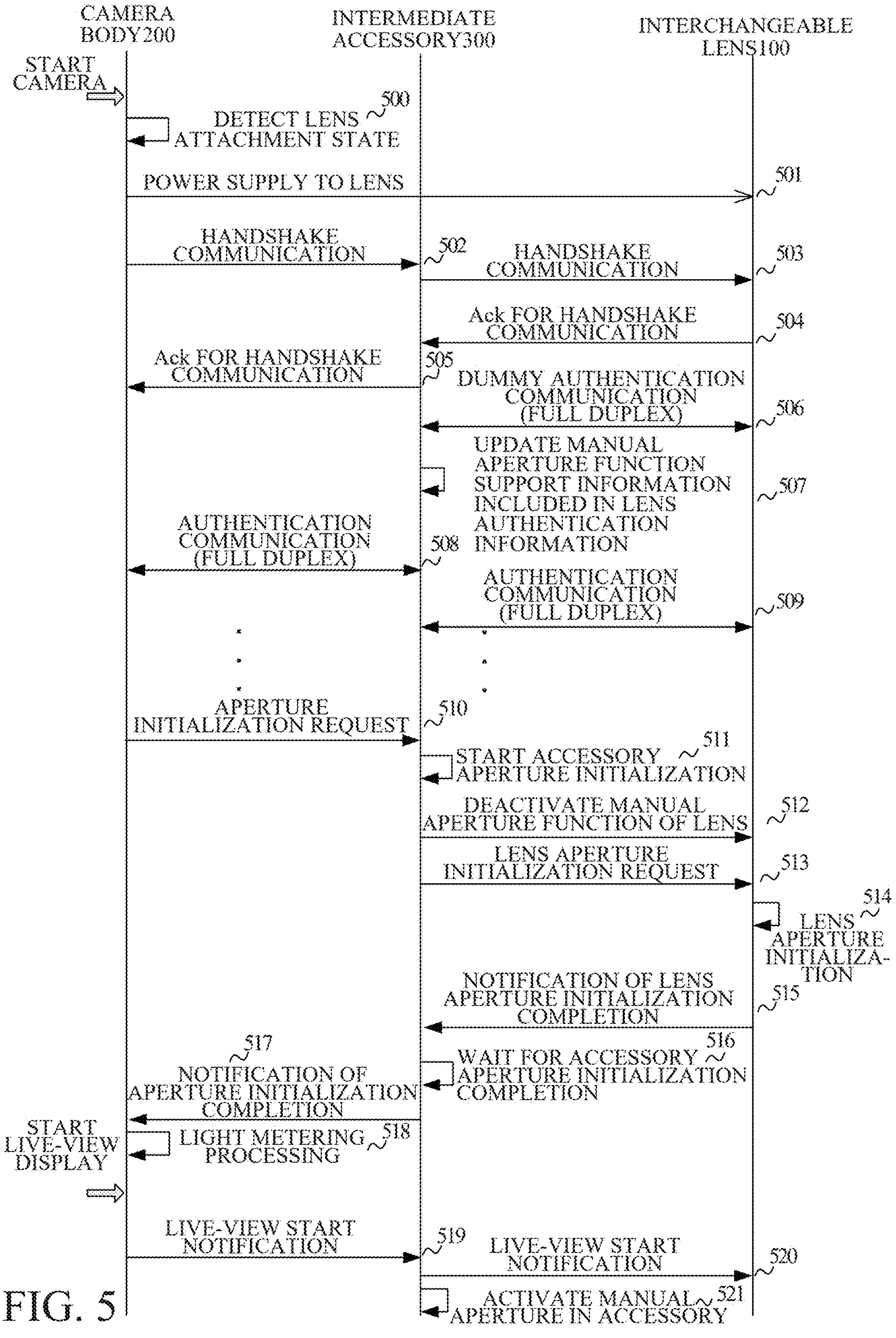
FIG. 5 explains a startup sequence according to the first to fourth embodiments.

Referring now to FIG. 5, a description will be given of the startup sequence when the power is turned on in a state where the camera body 200, interchangeable lens 100, and intermediate accessory 300 are combined. FIG. 5 explains the startup sequence.

In processing 500, the camera body 200 detects that both the intermediate accessory 300 and interchangeable lens 100 are attached by the ATTACH signal 2084 in FIG. 2.

In processing 501, power for driving the lens microcomputer 111 and various actuators of the lens is supplied from the camera body 200 to the interchangeable lens 100 via the power terminal 2085 in FIG. 2. This power supply is made to the power terminal 1125 of the interchangeable lens 100 via the power terminals 3030 and 3025 of the intermediate accessory 300. Thereby, the accessory microcomputer 301 and accessory aperture unit 303 of the intermediate accessory 300 can be driven with power supplied from the camera body 200.

In processing 502, handshake communication data to confirm communication establishment is transmitted from the camera communication circuit 208 to the lens communication circuit 112. This communication data is received by the accessory communication circuit 302, and the accessory communication circuit 302 communicates it to the lens communication circuit 112 in processing 503. The lens communication circuit 112 then transmits a response (AcK) to that communication to the camera communication circuit 208, and the accessory communication circuit 302 receives this communication data in processing 504 and responds to the camera communication circuit 208 with this communication data in processing 505. Thus, since the intermediate accessory 300 once processes the communication between the camera body 200 and the interchangeable lens 100, communication data can be communicated even if, for example, the communication method is different between the camera communication circuit 208 and the lens communication circuit 112.

A description will now be given of processing of authentication communication performed between the camera communication circuit 208 and the lens communication circuit 112 using the communication method illustrated in FIG. 3C. In this communication method, the camera communication circuit 208 requests the lens communication circuit 112 to acquire lens authentication information and transmits camera authentication information to the lens communication circuit 112 in a full duplex communication method. As described below, this communication also requires the accessory communication circuit 302 to mediate the communication with the camera communication circuit 208, similarly to the handshake communication described above. However, in this communication method, as described with reference to FIG. 3C, the accessory communication circuit 302, which is the sub communication component, cannot notify the camera communication circuit 208, which is the main communication component, of the communication standby request BUSY. Therefore, the intermediate accessory 300 is to previously acquire the lens authentication information on the interchangeable lens 100. Accordingly, in processing 506, the intermediate accessory 300 previously performs dummy authentication communication with the interchangeable lens 100 using the communication method illustrated in FIG. 3C. At this time, the intermediate accessory 300 has not yet acquired the camera authentication information, and thus the intermediate accessory 300 transmits a provisional value as the camera authentication information to the interchangeable lens 100 in the communication method illustrated in FIG. 3C, and acquires the lens authentication information.

In processing 507, the intermediate accessory 300 updates "information on whether the interchangeable lens 100 has a manual aperture function" included in the lens authentication information acquired from the interchangeable lens 100 in processing 506, to "the interchangeable lens 100 has a manual aperture function" and stores the lens authentication information.

In processing 508, authentication communication is performed from the camera body 200 using the communication method illustrated in FIG. 3C, and the intermediate accessory 300 responds to this communication. In this communication processing, the intermediate accessory 300 acquires correct camera authentication information from the camera body 200, and responds in processing 509 to the camera body 200 with the partially updated lens authentication information stored in processing 506.

By the above processing, the intermediate accessory 300 can mediate arbitration communication between the camera body 200 and the interchangeable lens 100 even in the case of full duplex communication as in the communication method illustrated in FIG. 3C. In this embodiment, the lens authentication information is previously acquired from the interchangeable lens 100 in processing 505, but the present disclosure is not limited to this example. For example, in the first frame of FIG. 3C, the intermediate accessory 300 may notify the camera body 200 of the communication standby request BUSY. In this case, the intermediate accessory 300 may perform authentication communication with the interchangeable lens 100 during this period and respond to the camera body 200 with the result.

In a case where an aperture initialization request is transmitted from the camera body 200 in processing 510, the intermediate accessory 300 starts initialization processing of the accessory aperture unit 303 in processing 511. In a case where the "information on whether the interchangeable lens 100 has a manual aperture function" included in the lens authentication information acquired from the interchangeable lens 100 in processing 506 is "the interchangeable lens 100 has a manual aperture function," the manual aperture function of the interchangeable lens 100 is deactivated. That is, in processing 512, the intermediate accessory 300 makes a communication request to the interchangeable lens 100 to deactivate the manual aperture function of the interchangeable lens 100.

In processing 513, the intermediate accessory 300 requests the interchangeable lens 100 to initialize the aperture unit 114. In processing 514, the interchangeable lens 100 performs initialization processing of the aperture unit 114. In processing 515, the intermediate accessory 300 is notified of the initialization completion of the aperture unit 114.

In processing 516, the intermediate accessory 300 confirms the completion of the initialization processing of the accessory aperture unit 303 that was started in processing 511, and notifies the camera body 200 of the completion of the aperture initialization in processing 517. As described above, this embodiment simultaneously performs the initialization processing of the accessory aperture unit 303 and the aperture unit 114 of the interchangeable lens 100. However, in a case where the power supplied from the camera body 200 is low, they may not be able to be simultaneously driven. In such a case, the intermediate accessory 300 may arbitrate the order of the aperture initialization processing so that the initialization processing of one of the accessory aperture unit 303 and the aperture unit 114 of the interchangeable lens 100 is completed first and the initialization processing of the accessory aperture unit 303 and the aperture unit 114 of the interchangeable lens 100 is not performed simultaneously.

In processing 518, the light metering (photometric) processing of the camera body 200 is performed and live-view display is started with proper exposure control. In processing 519, the camera body 200 transmits the live-view display implementation state, and the intermediate accessory 300 transmits the contents to the interchangeable lens 100 in processing 520 and activates the operation of the accessory aperture unit 303 in processing 521. Thereby, the aperture stop can be driven by the user operation of the manual aperture ring 411, as described later with reference to FIGS. 6A, 6B, and 6C. The above processing completes the startup processing by the camera body 200, the interchangeable lens 100, and the intermediate accessory 300.

Figure 8:
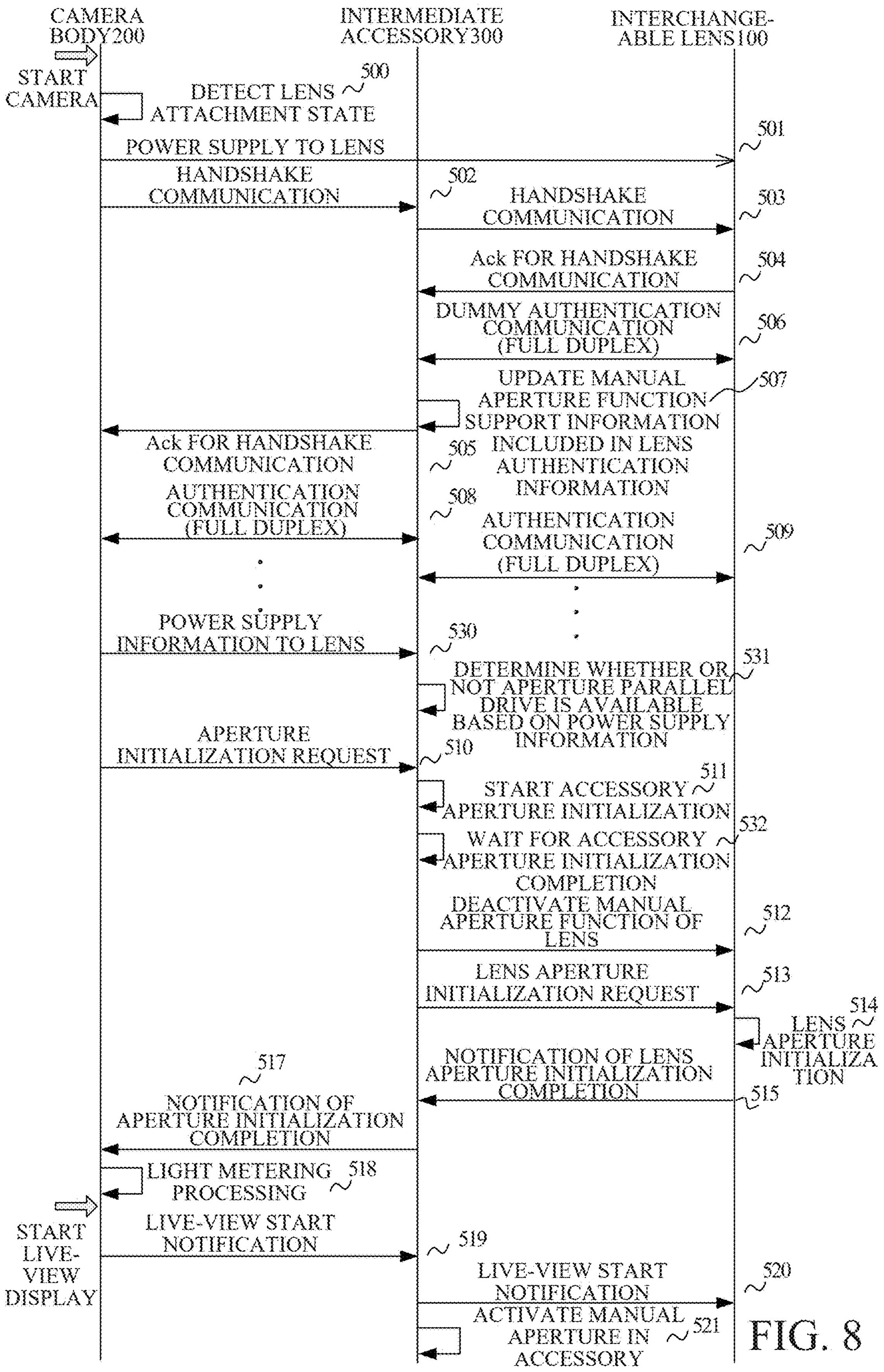
FIG. 8 is a variation of the startup sequence in the first to fourth embodiments.

Referring now to FIG. 8, a description will be given of a method of exclusively executing the initialization processing of the accessory aperture unit 303 and the aperture unit 114 of the interchangeable lens 100 in a case where the power supplied from the camera body 200 is low. FIG. 8 is a variation of the startup sequence in FIG. 5, and illustrates a method by which the intermediate accessory 300 arbitrates the order of the aperture initialization processing so that the initialization processing of the accessory aperture unit 303 and the aperture unit 114 is not performed simultaneously.

In processing 530, the intermediate accessory 300 acquires power supply information for the interchangeable lens 100 from the camera body 200. In processing 531, the intermediate accessory 300 determines whether or not to drive the accessory aperture unit 303 and the aperture unit 114 of the interchangeable lens 100 in parallel (whether or not to perform initialization processing simultaneously) based on the power supply information. In processing 532, the intermediate accessory 300 completes initialization of the accessory aperture unit 303. Thereafter, the intermediate accessory 300 requests the interchangeable lens 100 to initialize the aperture unit 114 in processing 513, and the interchangeable lens 100 initializes the aperture unit 114 in processing 514.

For example, the accessory microcomputer 301 determines whether or not the power supplied from the camera body 200 to the interchangeable lens 100 is equal to or greater than a predetermined threshold. In a case where the power is equal to or greater than the predetermined threshold, the accessory microcomputer 301 drives the accessory aperture unit 303 while the aperture unit 114 of the interchangeable lens 100 is being driven. On the other hand, in a case where the power is less than the predetermined threshold, the accessory aperture unit 303 is not driven while the aperture unit 114 is being driven.

Figure 6A:
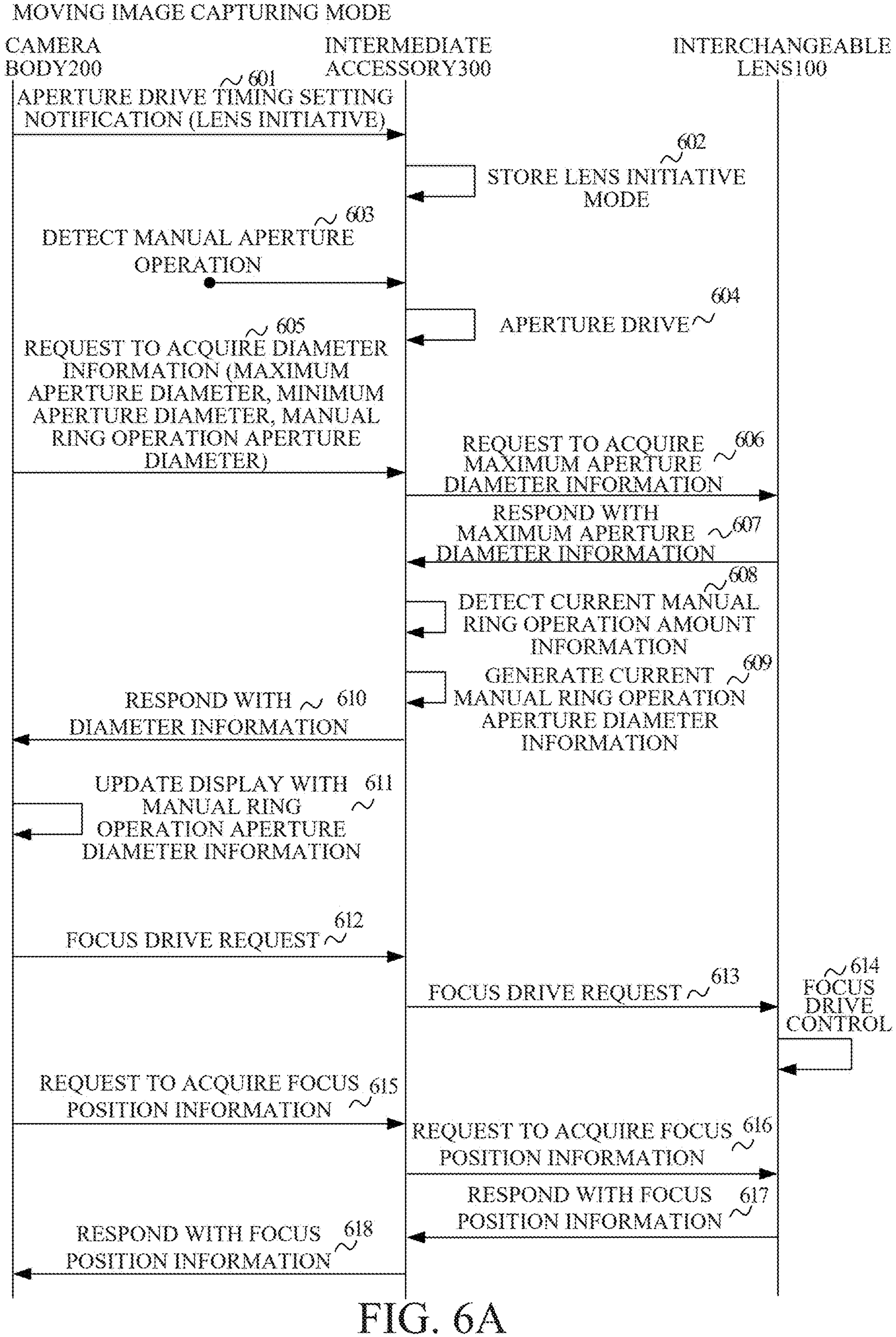
FIG. 6A explains an operation in a moving image capturing mode according to the first embodiment.
Figure 6B:
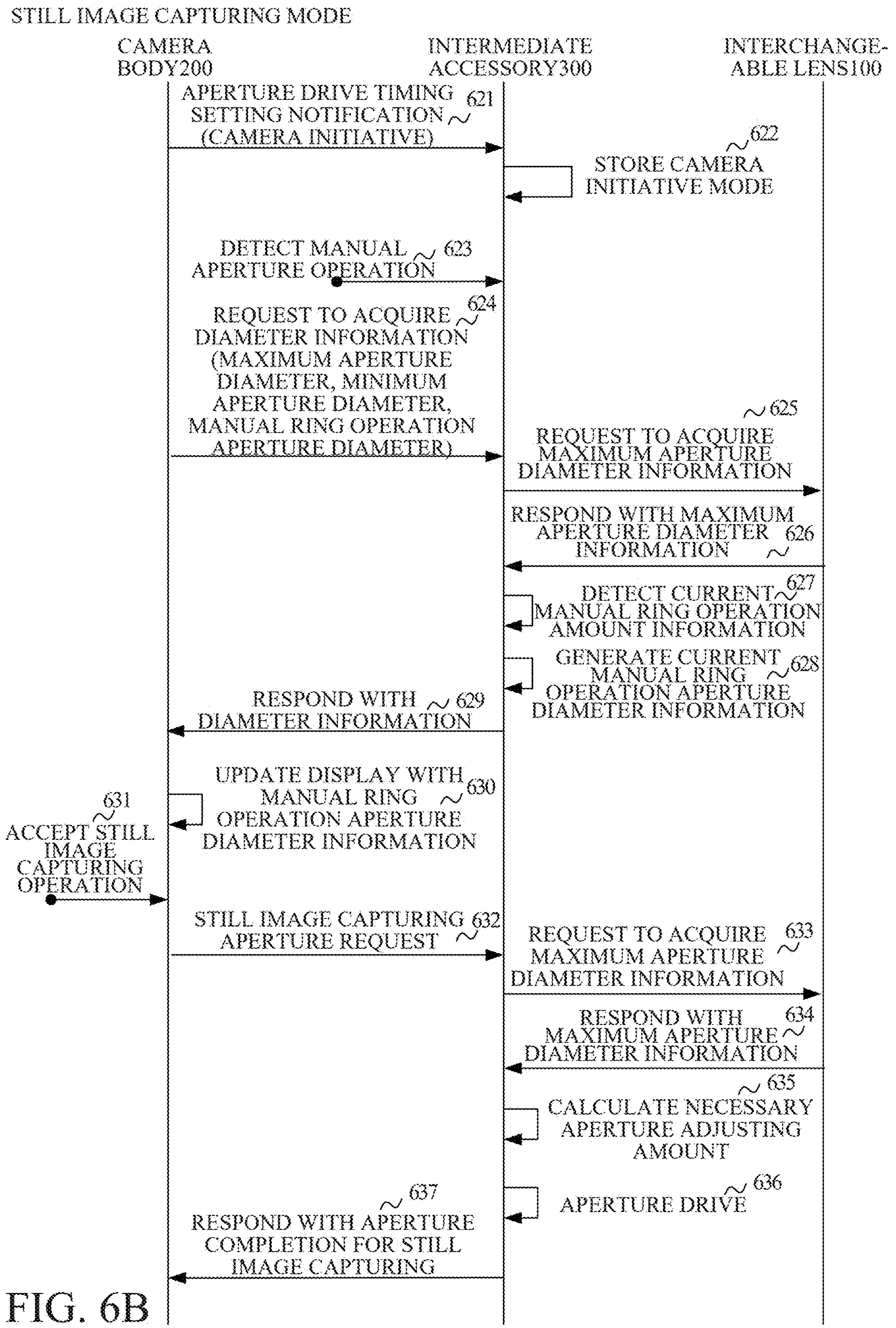
FIG. 6B explains an operation in a still image capturing mode according to the first embodiment.

Referring now to FIGS. 6A and 6B, a description will be given of operations of a moving image capturing mode (in or after processing 601) and a still image capturing mode (in or after processing 621) in a state where the camera body 200, the interchangeable lens 100, and the intermediate accessory 300 are combined. FIG. 6A explains the operation during system startup in the moving image capturing mode, and FIG. 6B explains the operation at the time of system startup in the still image capturing mode. Each operation illustrated in FIGS. 6A and 6B is mainly executed by commands from the camera microcomputer 205, the lens microcomputer 111, or the accessory microcomputer 301.

Example of Moving Image Capturing Mode

In processing 601, the camera body 200 notifies the intermediate accessory 300 of setting information regarding the aperture drive timing. This embodiment makes two types of notifications as this communication: "lens initiative" and "camera initiative." In the "lens initiative" setting, the aperture unit is driven as soon as the user performs the aperture operation. On the other hand, in the "camera initiative" setting, the display is switched when the user performs the aperture setting, but the aperture unit is not driven immediately. For example, in the still image capturing mode, the aperture diameter is set to be brighter than a predetermined aperture diameter in the live-view display state from the viewpoint of AF accuracy, and the "camera initiative" is set in the aperture narrowing (adjusting) control to the aperture diameter set during still image capturing. In processing 602, the intermediate accessory 300 stores this setting information (lens initiative mode).

In processing 603, it is detected that the manual aperture ring 411 illustrated in FIGS. 4A and 4B has been operated. In this embodiment, the intermediate accessory 300 includes the manual aperture ring 411, but manual ring operation information may be communicated from the camera body 200 or the interchangeable lens 100.

In processing 604, the accessory microcomputer 301 drives the accessory aperture unit 303 according to a ring operation amount detected in processing 603.

Thereafter, a request to acquire aperture diameter information is transmitted from the camera body 200 in processing 605. In this processing, the diameter information requested by the camera body 200 includes, for example, "maximum aperture diameter," "minimum aperture diameter," and "manual ring operation aperture diameter." The "maximum aperture diameter" refers to diameter information when the aperture is fully open. The "minimum aperture diameter" refers to diameter information when the aperture is most narrowed. The "manual ring operation aperture diameter" refers to diameter information in a case where the manual ring is operated.

The maximum aperture diameter has different specifications depending on the model of the attached interchangeable lens 100, and in the case of a zoom lens, it also changes depending on the zoom position. Therefore, the intermediate accessory 300 requests the interchangeable lens 100 to acquire maximum aperture diameter information in processing 606.

The intermediate accessory 300 (accessory microcomputer 301) acquires maximum aperture diameter information from the interchangeable lens 100 in processing 607, and a current aperture adjusting amount (control amount) of the accessory aperture unit 303 in processing 608. The intermediate accessory 300 then generates current manual ring operation diameter information in processing 609. The minimum aperture diameter information can be calculated from the maximum aperture diameter information and the aperture adjustable amount by which the accessory aperture unit 303 can be mechanically adjusted.

In processing 610, the intermediate accessory 300 responds to the camera body 200 with the diameter information generated in processing 606 to processing 609. In processing 611, the camera body 200 displays the current diameter information on the display unit 206 of the camera body 200.

Processing 612 to processing 618 illustrate an example of communication processing that is not related to the aperture stop (accessory aperture unit 303). For example, a focus drive request transmitted from the camera body 200 is transmitted as it is (forwarded) to the interchangeable lens 100 as in processing 614 via the intermediate accessory 300 in processing 613. In a case where a request to acquire focus position information is made from the camera body 200 in processing 615, the communication request is transmitted as it is to the interchangeable lens 100 in processing 616, and response information is also communicated as in processing 617 and processing 618. As described above, whether the intermediate accessory 300 arbitrates the communication order or edits the data, or transmits the data as is, is determined by the accessory microcomputer 301 of the intermediate accessory 300 according to the communication data.

That is, the accessory microcomputer 301 changes the communication processing method with the interchangeable lens 100 or the camera body 200 according to whether the received information received via the accessory communication circuit 302 is information regarding aperture control. Here, the information regarding the aperture control is information necessary for controlling at least one of the accessory aperture unit 303 and the aperture unit 114.

For example, the accessory microcomputer 301 determines whether the received information is information regarding aperture control. Here, in a case where the received information is not information regarding aperture control, first communication processing performed between the intermediate accessory 300 and the camera body 200 and second communication processing performed between the intermediate accessory 300 and the interchangeable lens 100 are performed using the same method. On the other hand, in a case where the received information is information regarding aperture control, the accessory microcomputer 301 performs the first communication processing and the second communication processing using different methods. For example, in a case where the received information received from one of the camera body 200 and the interchangeable lens 100 is not information regarding aperture control, the accessory microcomputer 301 transmits the received information as it is to the other of the camera body 200 and the interchangeable lens 100. On the other hand, in a case where the received information is information regarding aperture control, the received information is edited and responded to. Here, the edition includes, for example, performing processing necessary for controlling the accessory aperture unit 303 on the information (data) regarding the aperture control, and sending the processed data to the camera body 200 or the interchangeable lens 100, but is not limited to this example.

Example of Still Image Capturing Mode

In processing 621, the camera body 200 notifies the intermediate accessory 300 of the "camera initiative" setting as an aperture drive timing setting notification. In processing 622, the intermediate accessory 300 stores this setting information (camera initiative mode).

In processing 623, manual ring operation information is detected similarly to processing 603, but since the "camera initiative" setting has been stored as described above, the accessory aperture unit 303 is not controlled at this timing.

Processing 624 to processing 630 are similar to processing 605 to processing 611 in the moving image mode description, and the intermediate accessory 300 generates various diameter information, responds to the camera body 200, and displays it on the display unit 206 as the aperture set value.

In a case where a still image capturing operation (release operation) for still image capturing is accepted by the operation unit 207 of the camera body 200 in processing 631, an aperture drive command specifying aperture diameter information for still image capturing is transmitted from the camera body 200 in processing 632. At this time, since the lens internal state, such as a zoom position, may have changed since the intermediate accessory 300 acquired the maximum aperture diameter information from the interchangeable lens 100 in processing 625, the current aperture diameter information is acquired again from the interchangeable lens 100 in processing 633 and 634.

In processing 635, the accessory microcomputer 301 calculates the aperture adjusting amount to be driven from the maximum aperture diameter acquired in processing 633 for the aperture diameter specified by the camera body in processing 632.

In processing 636, the accessory aperture unit 303 is driven using the aperture adjusting amount calculated in processing 635, and a response is transmitted to the camera body 200 in processing 637 to notify the camera body 200 of the aperture drive completion for still image capturing.

Figure 7:
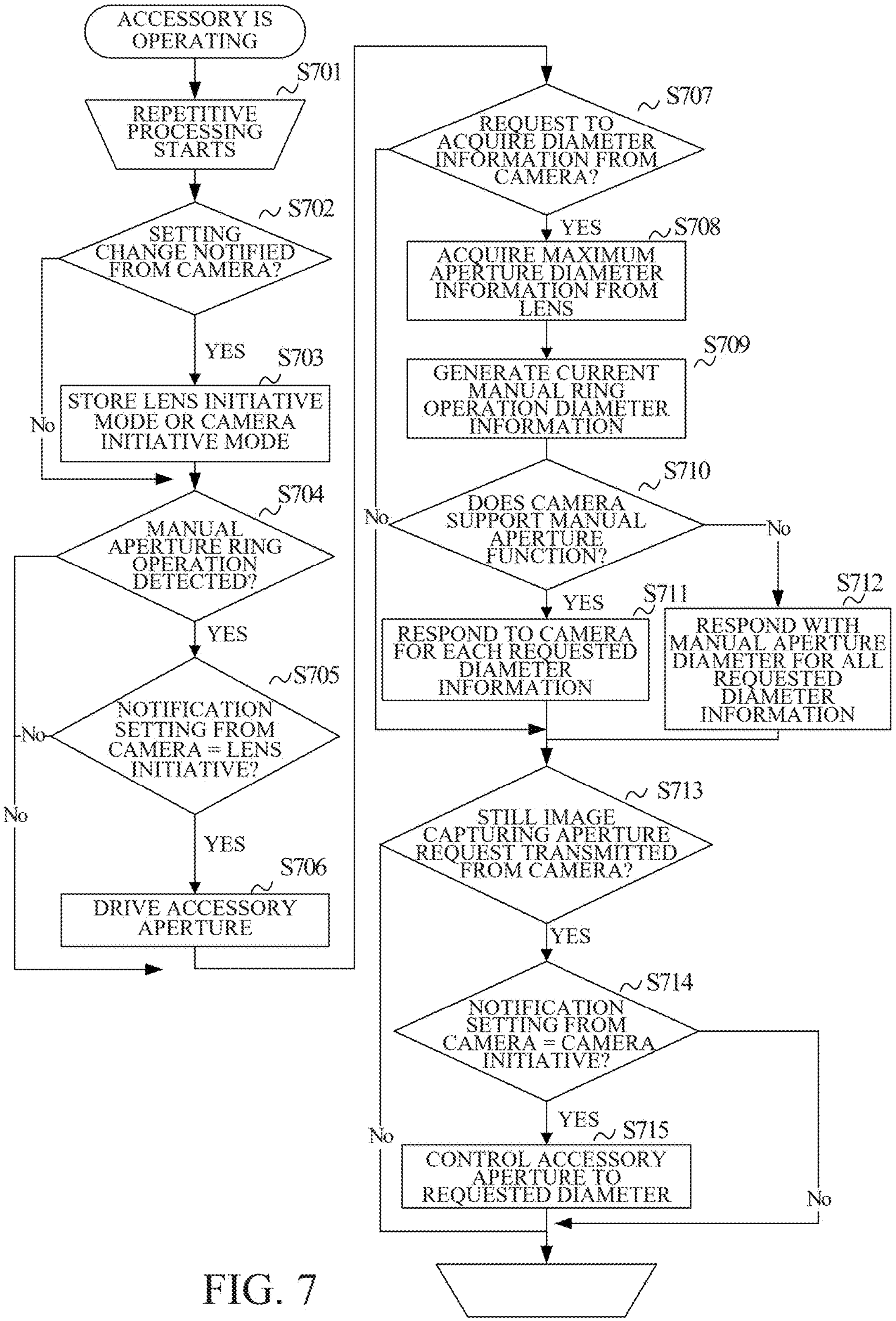
FIG. 7 is a flowchart illustrating an operation of the intermediate accessory according to the first embodiment.

Referring now to FIG. 7, a description will be given of the behavior of the intermediate accessory 300 according to this embodiment for the moving image capturing mode and still image capturing mode, in particular, a portion where branching processing occurs. FIG. 7 is a flowchart illustrating the operation of the intermediate accessory 300. Each step in FIG. 7 is mainly executed by the accessory microcomputer 301.

In step S701, the intermediate accessory 300 transitions to repetitive processing. In step S702, the intermediate accessory 300 determines whether there is a change notification in the aperture drive timing setting from the camera body 200. In a case where the change notification has been received from the camera body 200, the flow proceeds to step S703, where the intermediate accessory 300 stores the lens initiative mode or the camera initiative mode.

In step S704, the intermediate accessory 300 determines whether or not a manual ring operation has been detected. In a case where the manual ring operation has been detected, the flow proceeds to step S705, where it is determined whether the current aperture drive timing setting notified by the camera body 200 is "lens initiative." In a case where the setting is "lens initiative," the accessory microcomputer 301 drives and controls the accessory aperture unit 303 in step S706.

In a case where the intermediate accessory 300 is requested to acquire diameter information from the camera body 200 in step S707, the intermediate accessory 300 acquires the maximum aperture diameter from the interchangeable lens 100 in step S708. Next, in step S709, the intermediate accessory 300 acquires the aperture adjusting amount of the accessory aperture unit 303 and generates various diameter information.

In step S710, the intermediate accessory 300 determines whether or not the camera body 200 supports the manual aperture function based on the camera authentication information acquired from the camera body 200 in processing 508 of FIG. 5. In a case where it is determined that the manual aperture function is supported, the flow proceeds to step S711. On the other hand, in a case where it is determined that the manual aperture function is not supported, the flow proceeds to step S712.

In step S711, the intermediate accessory 300 properly responds to the diameter information requested by the camera body 200, for example, "maximum aperture diameter," "minimum aperture diameter," and "manual ring operation aperture diameter." In step S712, in a case where the "maximum aperture diameter," the "minimum aperture diameter," and the "manual ring operation aperture diameter" are requested by the camera body 200, the intermediate accessory 300 commonly responds with information on the "manual ring operation aperture diameter." Thereby, the intermediate accessory 300 can behave as if the lens has an aperture stop that cannot be controlled by the camera body 200.

In step S713, the intermediate accessory 300 determines whether or not an aperture drive request for still image capturing has been transmitted from the camera body 200. In a case where there is the request from the camera body 200 and the aperture drive timing setting notified by the camera body 200 in step S714 is "camera initiative," the intermediate accessory 300 controls the accessory aperture unit 303 to achieve the requested diameter in step S715.

Figure 6C:
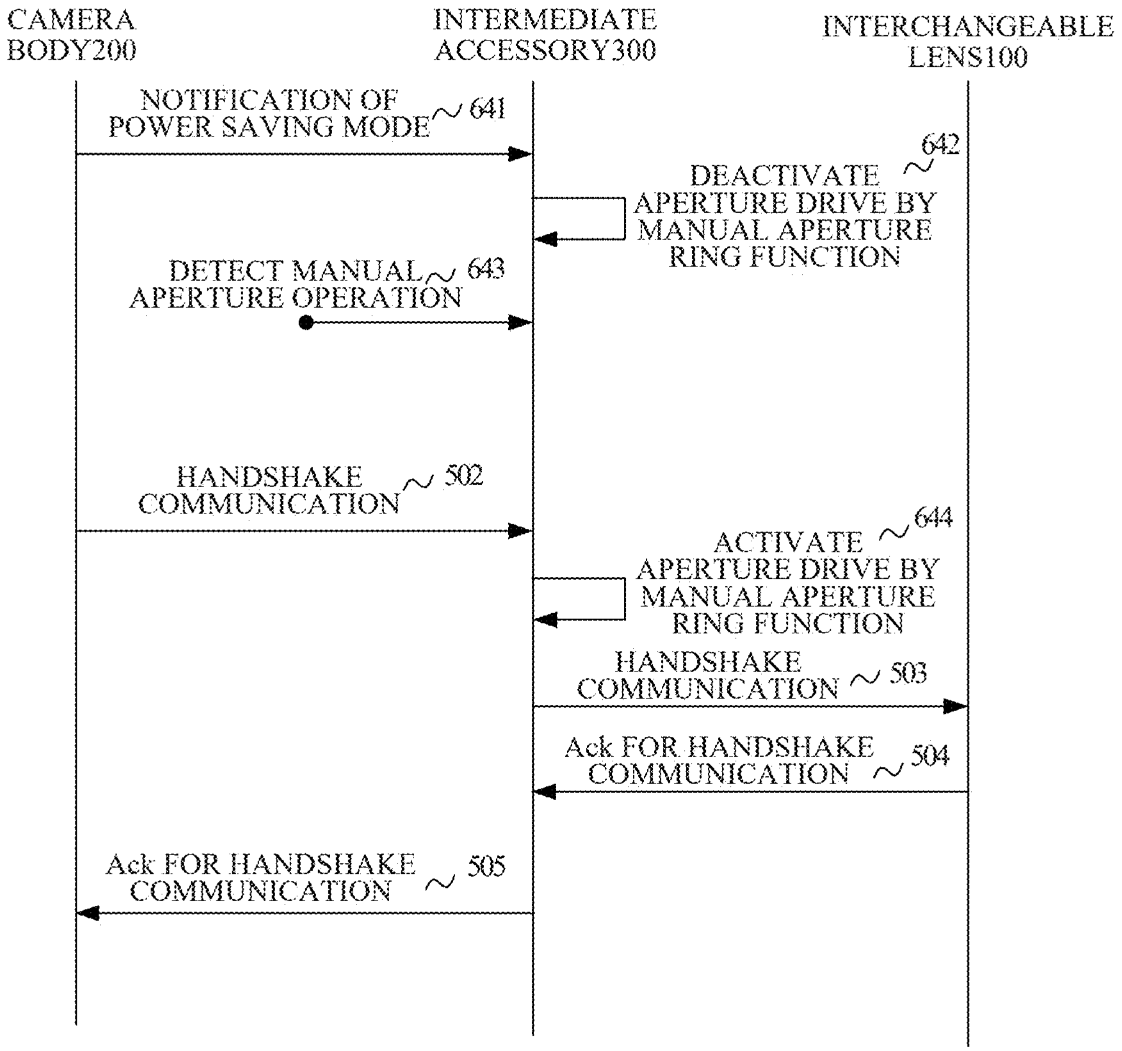
FIG. 6C explains the timing of deactivating the aperture control by a manual ring operation according to the first embodiment.

Referring now to FIG. 6C, a description will now be given of the timing for deactivating aperture control by manual ring operation. FIG. 6C explains the timing of deactivating aperture control by manual ring operation.

For example, in a case where the state transitions to a power saving mode in which the display unit 206 is turned off, when the state transitioning to the power saving mode is transmitted from the camera body 200 in processing 641, the intermediate accessory 300 deactivates aperture drive by the manual ring operation in processing 642. Therefore, even if the manual ring operation is detected in processing 643, the accessory microcomputer 301 does not drive the accessory aperture unit 303. Thus, the notification of the power saving mode (power saving request) from the camera body 200 can be used as a trigger to deactivate the aperture control. Alternatively, aperture control may be deactivated in a case where there is no communication from the camera body 200 for a predetermined time (in a case where no communication is performed for a predetermined time). Thereafter, in a case where the handshake communication of processing 502 described in FIG. 5 is performed from the camera body 200, the accessory microcomputer 301 activates the drive of the accessory aperture unit 303 by the manual ring operation in processing 644.

In this embodiment, the intermediate accessory 300 between the camera body 200 and the interchangeable lens 100 properly controls communications so as to realize the aperture drive timing set by the camera body 200 in a case where the user performs a manual ring operation. Thereby, aperture drive can be realized at a desired timing, and by properly communicating the aperture diameter information, a camera system with a highly accurate manual aperture function can be provided.

Second Embodiment

A description will now be given of a second embodiment according to the present disclosure. The configuration of a camera system according to this embodiment is similar to that of the first embodiment. In the camera system according to this embodiment, the intermediate accessory 300 always drives the accessory aperture unit 303 during a manual ring operation, regardless of the aperture drive timing setting information notified from the camera body 200.

Figure 9:
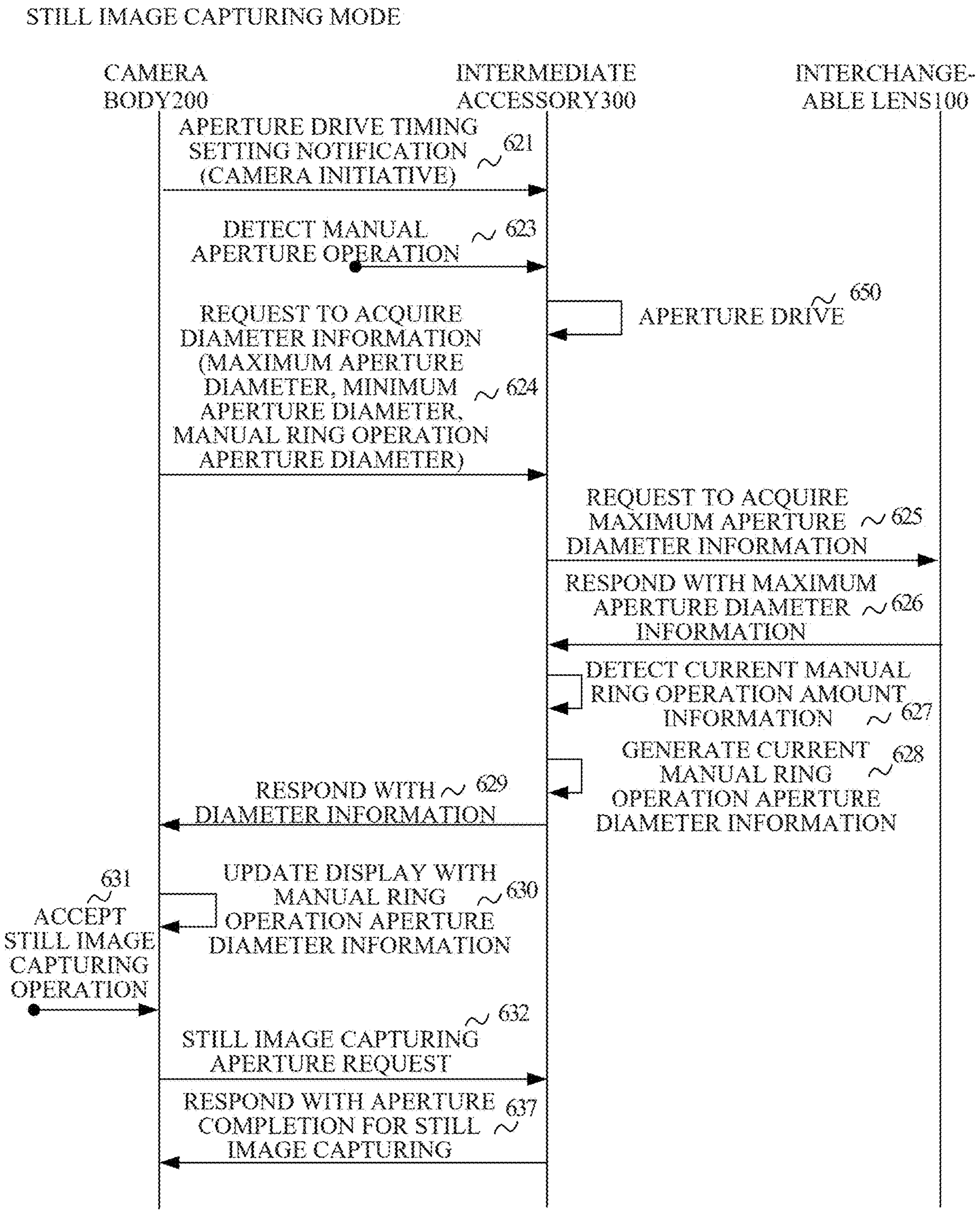
FIG. 9 explains an operation in a still image capturing mode according to the second embodiment.

Referring now to FIG. 9, a description will be given of the operation of the intermediate accessory 300 according to this embodiment. FIG. 9 explains the operation in the still image capturing mode in this embodiment. Processing in FIG. 9, which are corresponding processing in the first embodiment, will be designated by the same reference numerals.

FIG. 9 illustrates that the camera body 200 is in the still image capturing mode after processing 621. In processing 621, the camera body 200 notifies the intermediate accessory 300 of the "camera initiative" setting as an aperture drive timing setting notification, but the intermediate accessory 300 does not refer to this information.

Thereafter, in a case where the manual ring operation information is detected in processing 623, the first embodiment does not control the drive of the accessory aperture unit 303, but this embodiment controls the drive of the accessory aperture unit 303 in processing 650. On the other hand, in a case where a still image capturing operation for still image capturing is accepted by the operation unit 207 of the camera body 200 in processing 631, an aperture drive command specifying aperture diameter information for still image capturing is transmitted from the camera body 200 in processing 632. At this time, unlike the first embodiment, the accessory microcomputer 301 does not drive the accessory aperture unit 303.

In this embodiment, the accessory aperture unit 303 of the intermediate accessory 300 is driven in response to the user operation even in a case where the camera body 200 is in still image capturing mode. Therefore, even in a state where the maximum aperture state is expected as the control of the camera body 200, the intermediate accessory 300 between the camera body 200 and the interchangeable lens 100 can properly control communications. Thereby, this embodiment can properly communicate aperture diameter information and provide a camera system with a more accurate manual aperture function than ever.

Third Embodiment

A description will now be given of a third embodiment according to the present disclosure. In addition to the configuration of the first embodiment, the camera system according to this embodiment also has a manual aperture function in the interchangeable lens 100. In the camera system according to this embodiment, in a case where both the interchangeable lens 100 and the intermediate accessory 300 have manual aperture functions, the camera system according to this embodiment automatically executes the manual aperture function of the apparatus operated by the user.

Figure 10A:
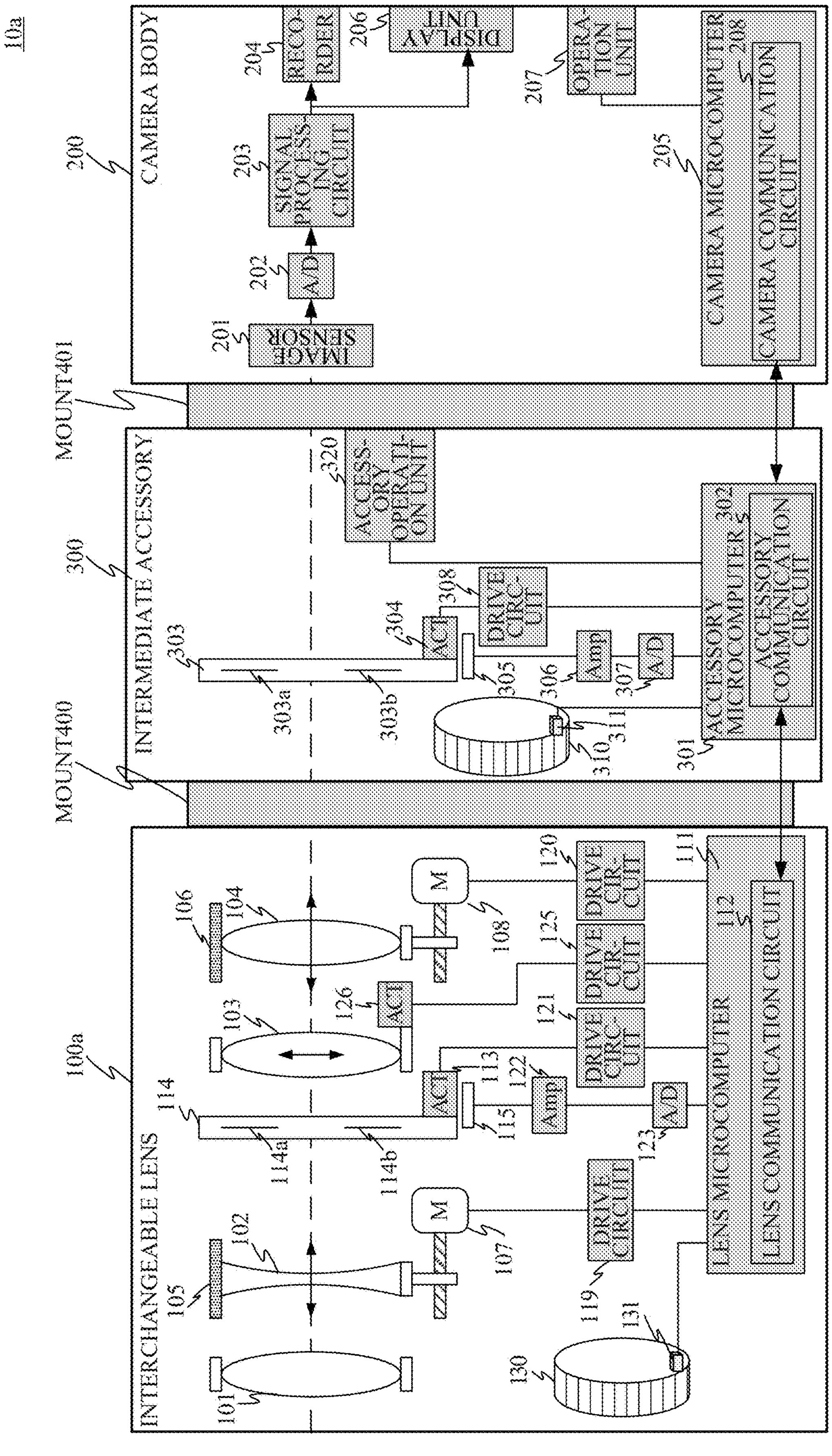
FIG. 10A is a block diagram of an imaging system according to the third and fourth embodiments.

Referring now to FIG. 10A, a description will be given of a camera system (imaging system) **10*a* according to this embodiment. FIG. 10A is a block diagram of the camera system 10*a*. The camera system 10*a* is different from the camera system 10 according to the first embodiment in that it has an interchangeable lens 100*a* instead of the interchangeable lens 100. In addition to the configuration of the interchangeable lens 100, the interchangeable lens 100*a* includes a lens-side manual aperture operation ring (electronic ring) 130 that is rotatable by the user, and a ring rotation detector 131. The ring rotation detector 131** includes, for example, a photo-interrupter that outputs a two-phase signal according to the rotation of the lens-side manual aperture operation ring 130. The lens microcomputer 111 can detect a rotation amount (including a direction) of the lens-side manual aperture operation ring 130 using the two-phase signal.

Figure 10B:
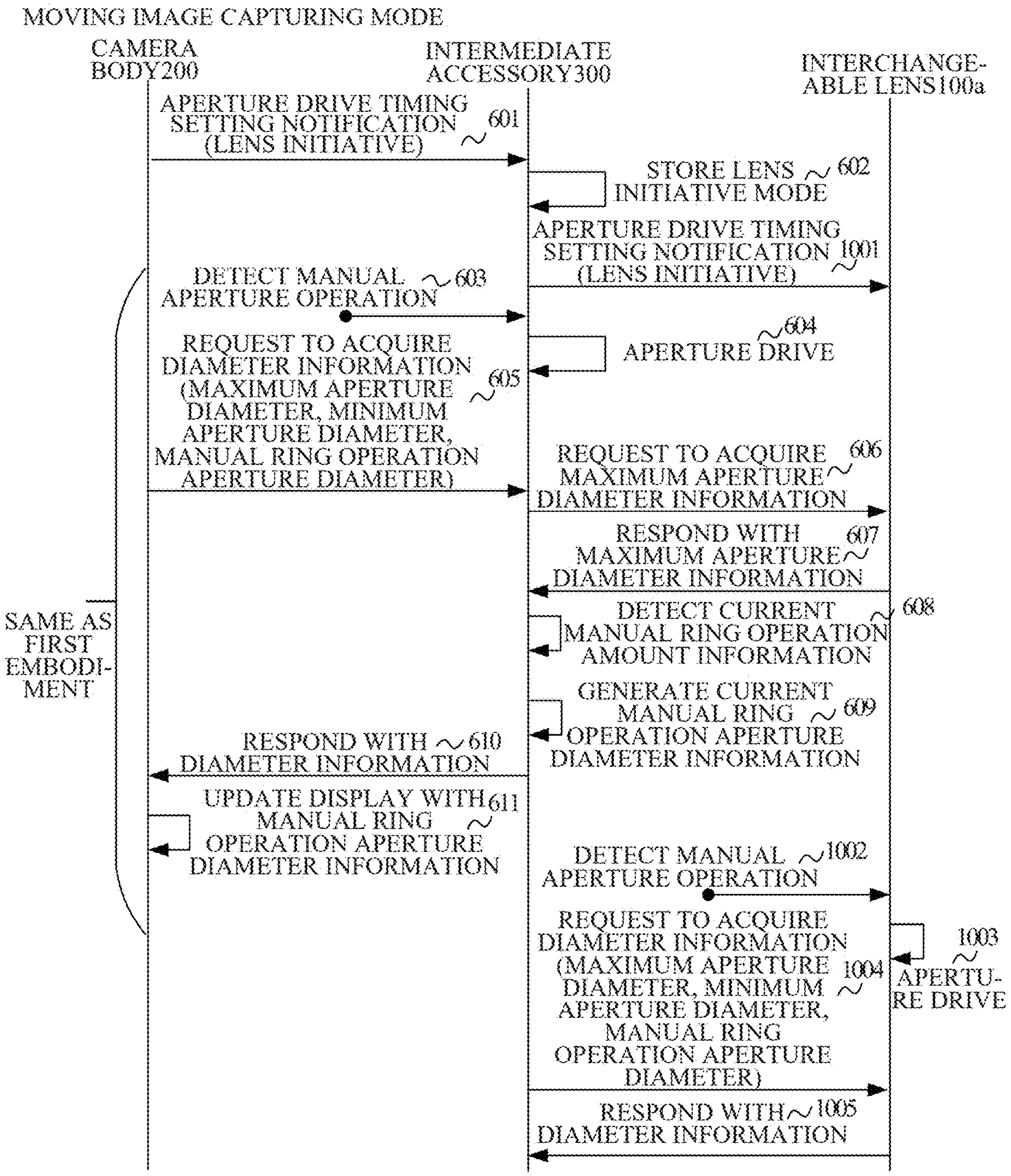
FIGS. 10B and 10C explain an operation in a moving image recording mode according to the third embodiment.
Figure 10C:
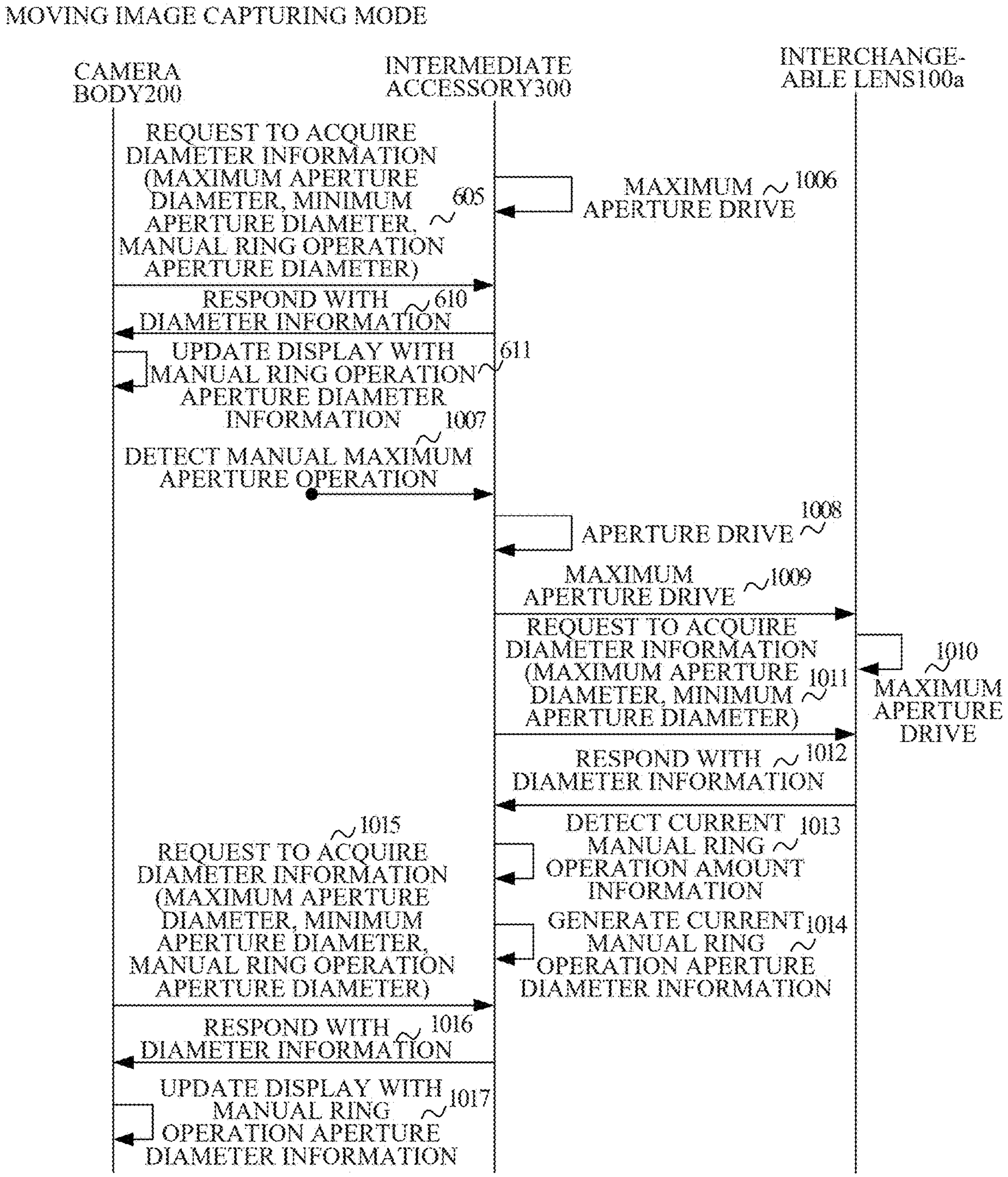
Figure 10D:
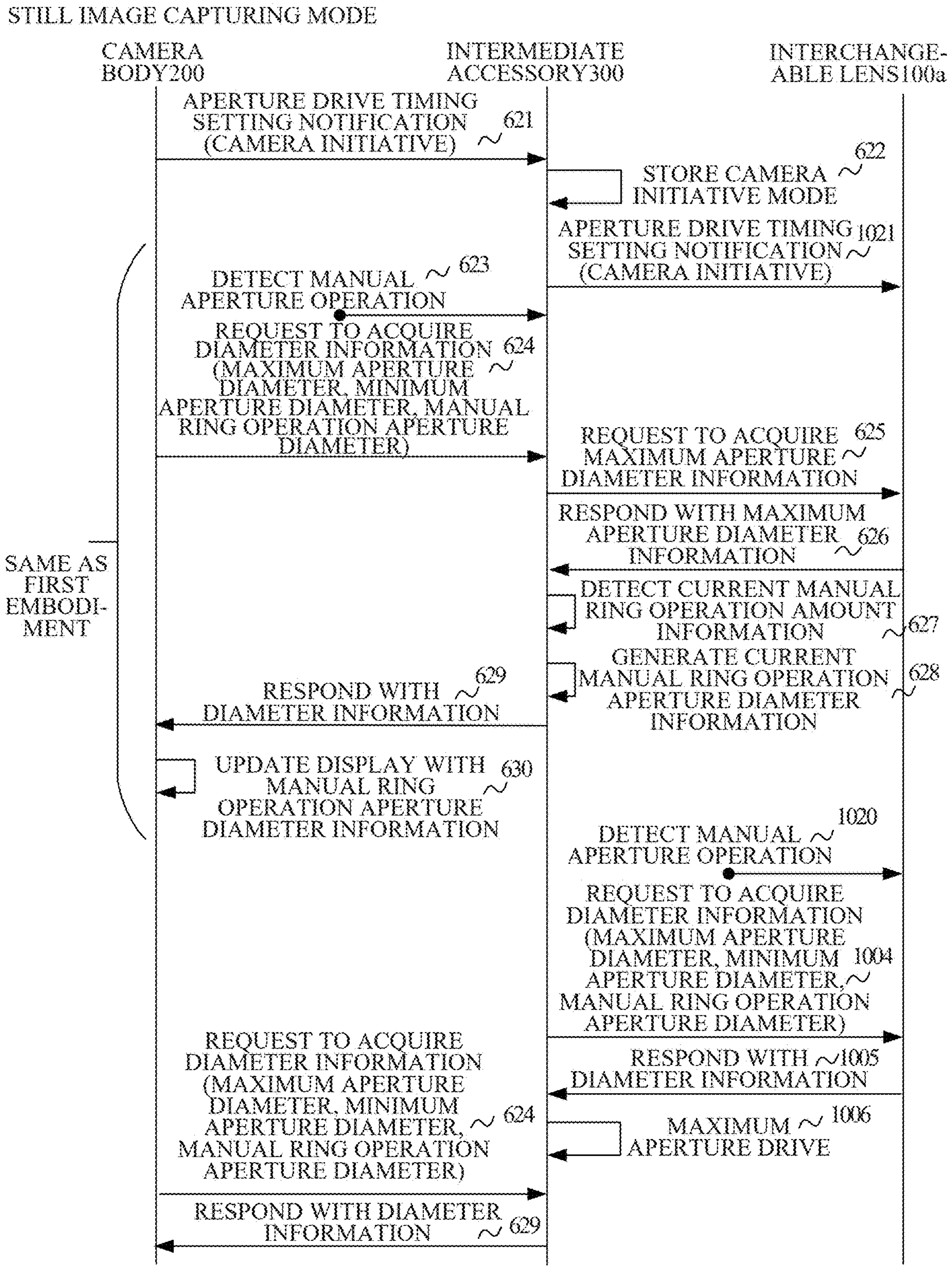
FIGS. 10D and 10E explain an operation in a still image recording mode according to the third embodiment.
Figure 10E:
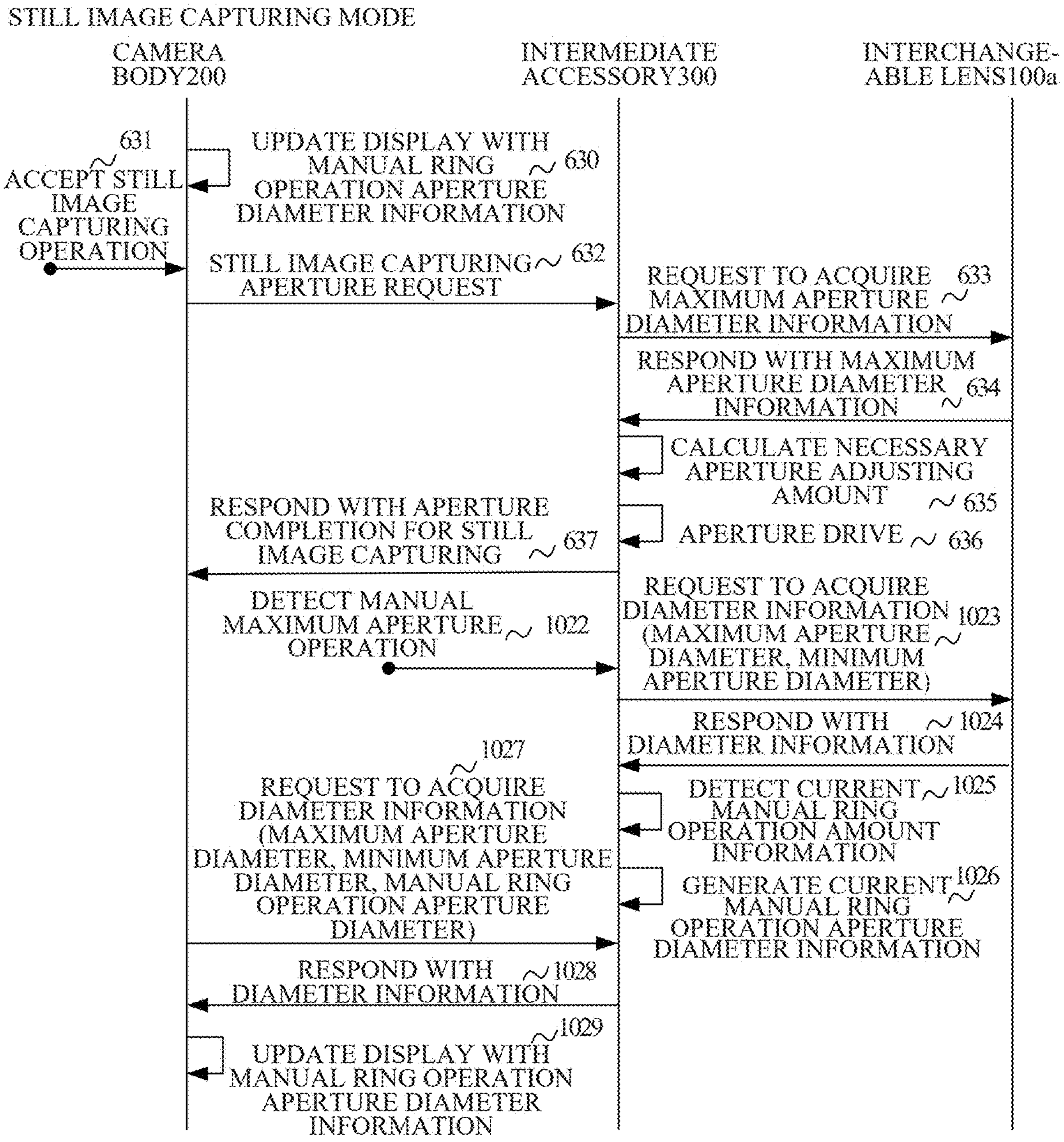

Referring now to FIGS. 10B, 10C, 10D, and 10E, a description will be given of operations of the moving image capturing mode (in and after processing 601) and the still image capturing mode (in and after processing 621) in a state where the camera body 200, the interchangeable lens 100, and the intermediate accessory 300 are combined. FIGS. 10B and 10C explain the operation in the moving image capturing mode, and FIGS. 10D and 10E explain the operation in the still image capturing mode. Processing in FIGS. 10B, 10C, 10D, and 10E, which are corresponding processing in the first embodiment, will be designated by the same numerals.

Example of Moving Image Capturing Mode

In processing 601, the camera body 200 notifies the intermediate accessory 300 of "lens initiative" as setting information regarding the aperture drive timing. In processing 602, the intermediate accessory 300 stores the lens initiative mode. In processing 1001, the intermediate accessory 300 transmits to the interchangeable lens 100 "lens initiative" as the information on the aperture drive timing from the camera body 200 indicating that the timing (notification in the lens initiative mode). At this time, whether or not the intermediate accessory 300 performs the above communication depends on the condition that the "information on whether or not the interchangeable lens 100 has a manual aperture function" included in the lens authentication information acquired from the interchangeable lens 100 at startup has a manual aperture function. Processing 603 to processing 611 are performed in a case where the user performs a manual ring operation on the intermediate accessory 300, and are similar to those of the first embodiment.

Thereafter, in processing 1002, in a case where the interchangeable lens 100 detects a lens-side manual ring operation by the user, the interchangeable lens 100 drives the lens-side aperture unit 114 in processing 1003, and the manual ring operation aperture diameter information managed by the interchangeable lens 100 is updated.

The intermediate accessory 300 periodically transmits a request to acquire diameter information to the interchangeable lens 100 in processing 1004, and the interchangeable lens 100 responds to the intermediate accessory 300 with various diameter information including the manual ring operation aperture diameter information described above in processing 1005.

The intermediate accessory 300 can recognize that a manual ring operation of the interchangeable lens 100 has been performed based on the diameter information obtained in processing 1005, and drives the accessory aperture unit 303 to the maximum aperture state in processing 1006. The aperture unit 114 of the interchangeable lens 100*a* in processing 1003 and the accessory aperture unit 303 in processing 1006 are driven simultaneously. However, this embodiment is not limited to this example, and depending on the circumstances of the power supply from the camera body 200, the aperture unit 114 and the accessory aperture unit 303 may be exclusively driven as described with reference to FIG. 8. Thereafter, processing 605, processing 610, and processing 611 are performed, and thereby the display of diameter information on the display unit 206 is updated in accordance with the manual aperture operation of the interchangeable lens 100*a*.

Then, in a case where the user again performs the manual ring operation of the intermediate accessory 300 in processing 1007, the intermediate accessory 300 controls the accessory aperture unit 303 (aperture drive control) in processing 1008 in accordance with a ring operation amount by the user detected in processing 1007. In processing 1009, the intermediate accessory 300 transmits a maximum aperture drive request to the interchangeable lens 100. In processing 1010, the interchangeable lens 100*a* drives the aperture unit 114 to the maximum aperture, and the manual ring operation aperture diameter information managed by the interchangeable lens 100 is also updated.

In processing 1011, the intermediate accessory 300 periodically transmits a request to acquire diameter information to the interchangeable lens 100, and the interchangeable lens 100 responds to the intermediate accessory 300 in processing 1012 with various diameter information including the manual ring operation aperture diameter information described above. There is an advantage in that the aperture adjusting control of the intermediate accessory 300 in processing 1008 can be performed before the maximum aperture drive of the interchangeable lens 100 in processing 1010 to avoid abrupt changes in aperture diameter, but the order of these aperture drives is not limited.

In processing 1013, operation amount information on the accessory aperture unit 303 is acquired, and current manual ring operation aperture diameter information is generated in processing 1014 by combining this with the maximum aperture diameter information on the interchangeable lens 100 acquired in processing 1012.

Processing 1015, processing 1016, and processing 1017 are similar to processing 605, processing 610, and processing 611, and the diameter information resulting from the manual ring operation of the intermediate accessory is displayed and updated on the display unit 206.

Example of Still Image Capturing Mode

In processing 621, the camera body 200 notifies the intermediate accessory 300 of "camera initiative" as setting information regarding the aperture drive timing. In processing 622, the intermediate accessory 300 stores the camera initiative mode. In processing 1021, the intermediate accessory 300 transmits to the interchangeable lens 100*a* "camera initiative" as setting information regarding the aperture drive timing from the camera body 200. Processing 623 to processing 630 are performed in a case where the user performs manual ring operation of the intermediate accessory 300, and are similar to those of the first embodiment.

Thereafter, in processing 1020, even if the interchangeable lens 100*a* detects a lens-side manual ring operation by the user, the interchangeable lens 100 has received the "camera initiative" setting and does not drive the aperture. The manual ring operation aperture diameter information managed by the interchangeable lens 100 is updated as set value information according to the lens-side manual ring operation amount.

Thereafter, processing 1004, processing 1005, and processing 1006 are similar to processing designated by the same reference numerals in the moving image capturing mode described above, and processing 624, processing 629, and processing 630 are similar to processing designated by the same reference numerals in the still image capturing mode in the first embodiment. The display of the diameter information on the display unit 206 is updated according to the manual ring operation of the interchangeable lens 100*a*, and the user can recognize the aperture value during imaging set by the diameter information displayed on the display unit 206.

Thereafter, in processing 631 to processing 637, aperture control for imaging by the user operation is performed similarly to the first embodiment. This embodiment achieves aperture control during imaging by driving the accessory aperture unit 303, but may use the aperture unit 114 in the interchangeable lens 100. Then, in processing 1022, the user again performs manual aperture operation of the intermediate accessory 300.

In processing 1023 and processing 1024, the intermediate accessory 300 periodically acquires diameter information for the interchangeable lens 100. In processing 1025 and processing 1026, the intermediate accessory 300 generates current manual ring operation aperture diameter information by combining the operation amount information on the accessory aperture unit 303 and the maximum aperture diameter information on the interchangeable lens 100. Processing 1027, processing 1028, and processing 1029 are similar to processing 624, processing 629, and processing 630, and the diameter information as a result of the manual ring operation of the intermediate accessory 300 is displayed and updated on the display unit 206.

In this embodiment, in a case where the manual ring operation is available in both the intermediate accessory 300 and the interchangeable lens 100*a*, both the manual ring operation of the intermediate accessory 300 and the manual aperture operation of the interchangeable lens 100 are available. In addition, regardless of which aperture unit is operated, the intermediate accessory 300 properly transmits diameter information regarding a light beam incident on the camera mount portion of the camera body 200 to the camera body 200. Thereby, this embodiment can provide a camera system with a manual aperture function with higher accuracy than ever.

Fourth Embodiment

A description will now be given of a fourth embodiment according to the present disclosure. The configuration of a camera system according to this embodiment is similar to that of the third embodiment. In this embodiment, in a case where both the interchangeable lens 100*a* and the intermediate accessory 300 have a manual aperture function, the manual aperture function of the apparatus operated by the user is automatically executed, and the aperture position of the aperture unit of the apparatus not operated is maintained.

Figure 11A:
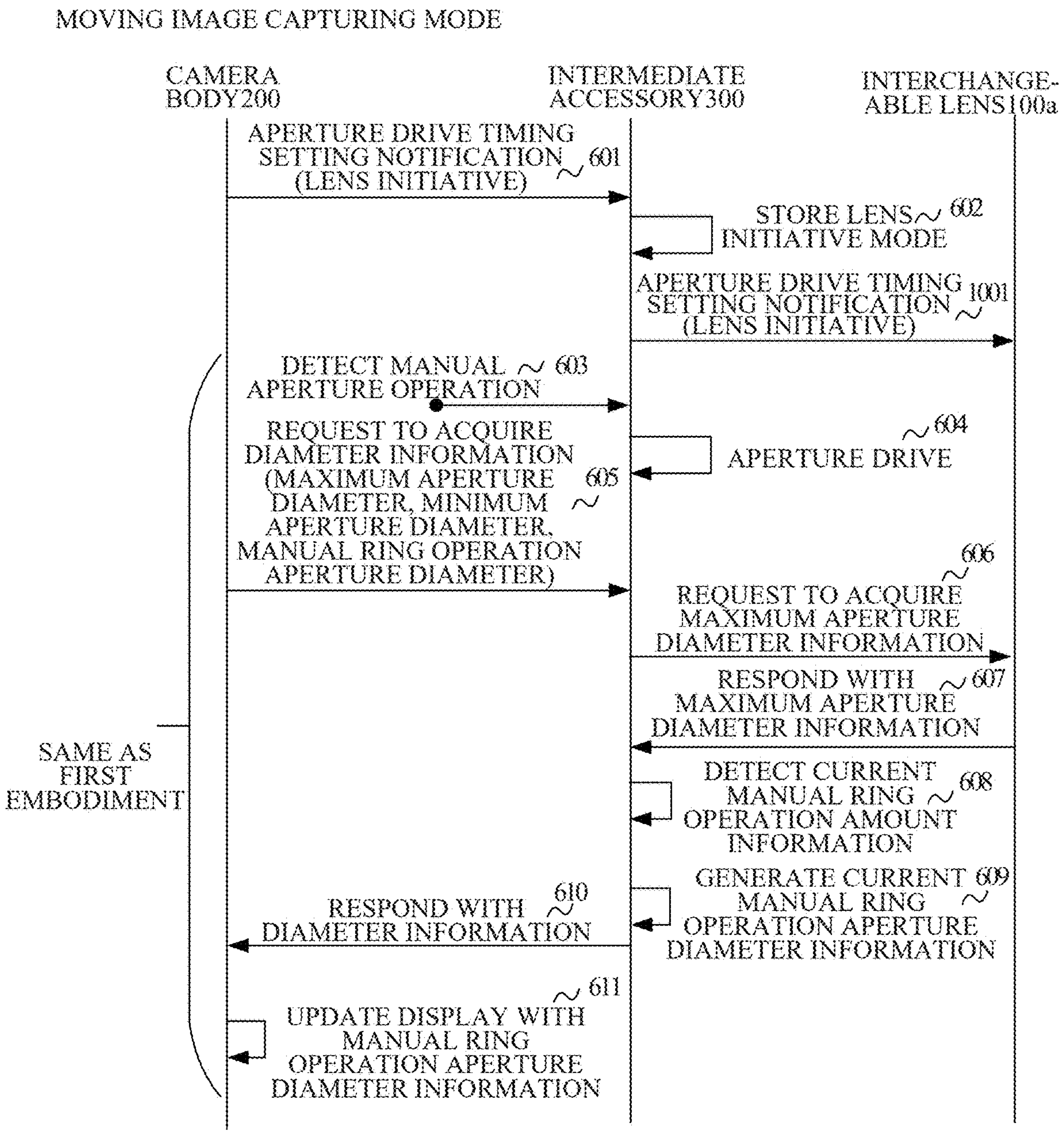
FIGS. 11A and 11B explain an operation in a moving image recording mode according to the fourth embodiment.
Figure 11B:
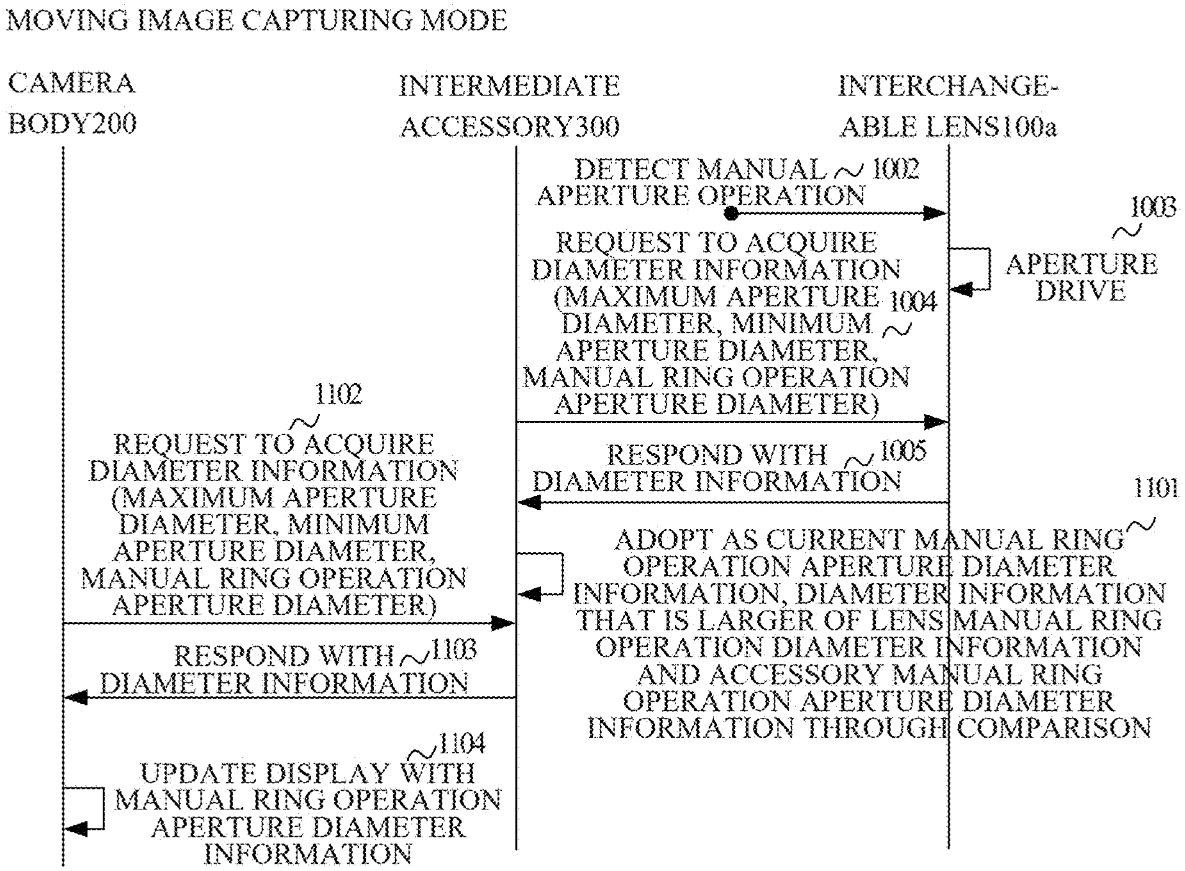

Referring now to FIGS. 11A and 11B, a description will be given of a moving image recording mode according to this embodiment. FIGS. 11A and 11B explain the operation in the moving image recording mode. Processing, which are corresponding processing in the first and third embodiments, will be designated by the same reference numerals.

Processing 601 to processing 1005 are similar to those of the third embodiment, and after the accessory aperture unit 303 (processing 604) is performed based on a "lens initiative" notification from the camera body 200, the lens-side aperture unit 114 is operated (processing 1003).

In processing 1101, the intermediate accessory 300 compares the manual ring operation aperture diameter information acquired from the interchangeable lens 100*a* in processing 1004 and processing 1005 with the accessory manual ring operation aperture diameter information. Here, the accessory manual ring aperture diameter information is generated using the current aperture adjusting amount (control amount) of the accessory aperture unit 303 of the intermediate accessory 300 and the maximum aperture diameter information acquired from the interchangeable lens 100*a*.

In a case where the "lens manual ring operation aperture diameter information"≥the "accessory manual ring operation aperture diameter information," the "lens manual ring operation aperture diameter information" is managed as the current manual ring aperture diameter information. On the other hand, in a case where the "lens manual ring operation aperture diameter information"<the "accessory manual ring operation aperture diameter information," the "accessory manual ring operation aperture diameter information" is managed as the current manual ring aperture diameter information. A larger value means a narrower aperture.

In a case where a request to acquire diameter information is transmitted from the camera body 200 in processing 1102, the current manual ring aperture diameter information managed in processing 1101 is responded to in processing 1103. Then, in processing 1104, the current diameter information is displayed on the display unit 206 of the camera body 200, and thereby narrower diameter information is displayed for the accessory aperture unit 303 in the intermediate accessory 300 and the aperture unit 114 in the interchangeable lens 100*a*.

In this embodiment, in a case where both the intermediate accessory 300 and the interchangeable lens 100 can provide the manual ring operation, both the manual ring operation of the intermediate accessory 300 and the manual ring operation of the interchangeable lens 100 are available. In a case where either aperture unit is operated, the intermediate accessory 300 properly transmits diameter information incident on the camera mount portion to the camera body 200. The aperture unit that is not being operated is made to maintain its current position, and thereby responsiveness improves in switching between the aperture operations of them. Thereby, this embodiment can provide a camera system with a more accurate manual aperture function than ever.

Fifth Embodiment

A description will now be given of a fifth embodiment according to the present disclosure. The basic configuration of a camera system according to this embodiment is similar to that of the first embodiment. On the other hand, this embodiment is different from the first embodiment in that the camera system includes an interchangeable lens 100*b* that has no communication terminal for communicating with the camera body 200 or no communication function instead of the interchangeable lens 100. In other words, the camera body 200 or the intermediate accessory 300 cannot communicate with the interchangeable lens 100*b* at all, and therefore cannot obtain information about the interchangeable lens 100*b* via communication. Even with such an interchangeable lens 100*b*, this embodiment provides a manual aperture function with the intermediate accessory 300.

Figure 12A:
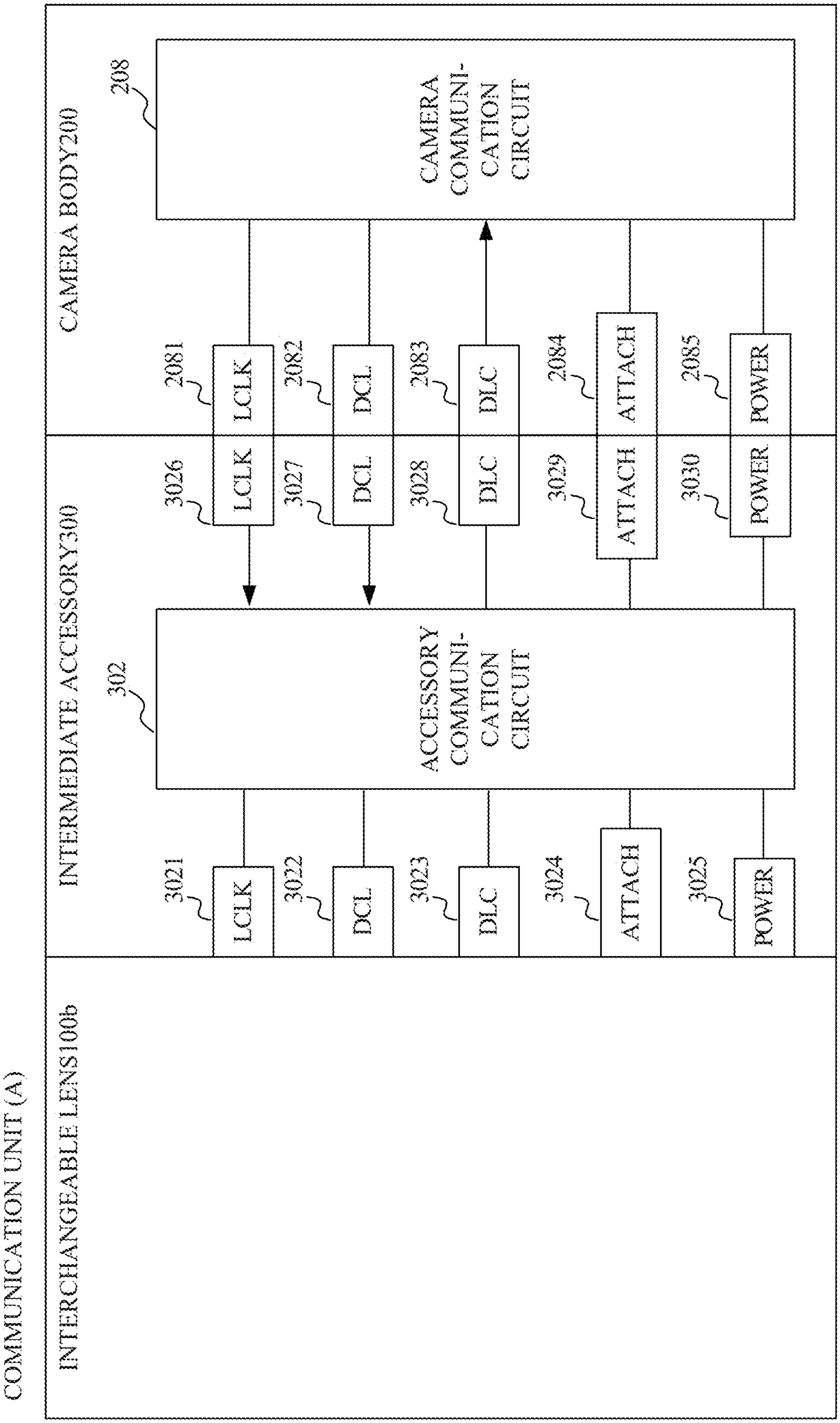
FIGS. 12A, 12B and 12C explain each communication unit of the camera body and intermediate accessory according to a fifth embodiment, and an external view of the intermediate accessory.

FIG. 12A explains the communication units of the camera body 200 and intermediate accessory 300. They are similar to those of the first embodiment except that the interchangeable lens 100*b* has no communication terminal. In this configuration, the accessory communication circuit 302 of the intermediate accessory 300 does not detect the attachment of the interchangeable lens 100 by the ATTACH signal 3024. On the other hand, power is supplied from the camera body 200 via POWER signals 2085 and 3030, and the accessory microcomputer 301 and accessory aperture unit 303 of the intermediate accessory 300 can be driven.

Figure 12B:
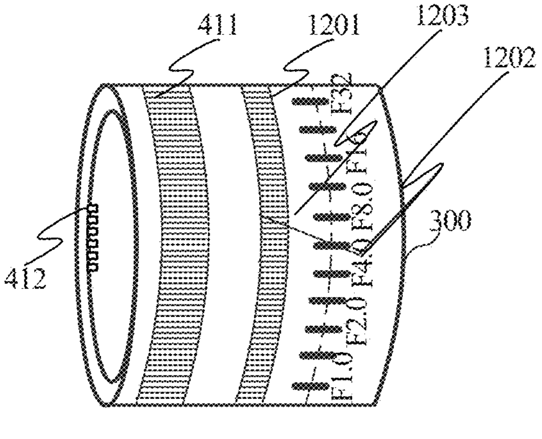
Figure 12C:
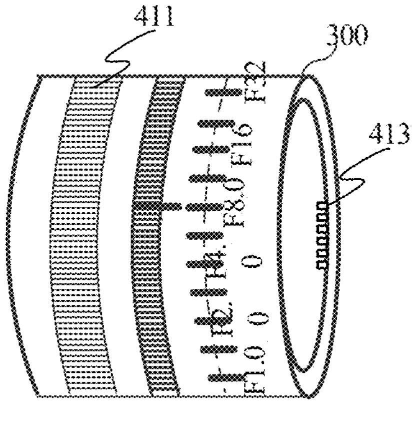

FIG. 12B illustrates the inside of the mount of the interchangeable lens 100*b*, and reference numeral 412 denotes a lens-side communication terminal, which corresponds to 3021 to 3025 in FIG. 2. FIG. 12C illustrates the inside of the mount of the camera body 200, and reference numeral 413 denotes a camera-side communication terminal, which corresponds to 3026 to 3030 in FIG. 2. Reference numerals 1201, 1202, and 1203 are provided as members for setting maximum aperture diameter information by the user operation in a case where that information cannot be acquired from the interchangeable lens 100*b* via communication, but do not necessarily have to have the same configuration.

Reference numeral 1201 denotes an operation ring (input unit capable of inputting diameter information regarding a light beam entering the camera body 200) for selecting the maximum aperture diameter in a case where the interchangeable lens 100*b* having no electronic contacts is attached. Reference numeral 1202 denotes an index for the user to set the maximum aperture diameter of the attached interchangeable lens 100*b*. Reference numeral 1203 denotes a mark for specifying the maximum aperture diameter. The maximum aperture diameter information on the selected index 1202 can be electrically recognized by the accessory microcomputer 301.

Figure 13A:
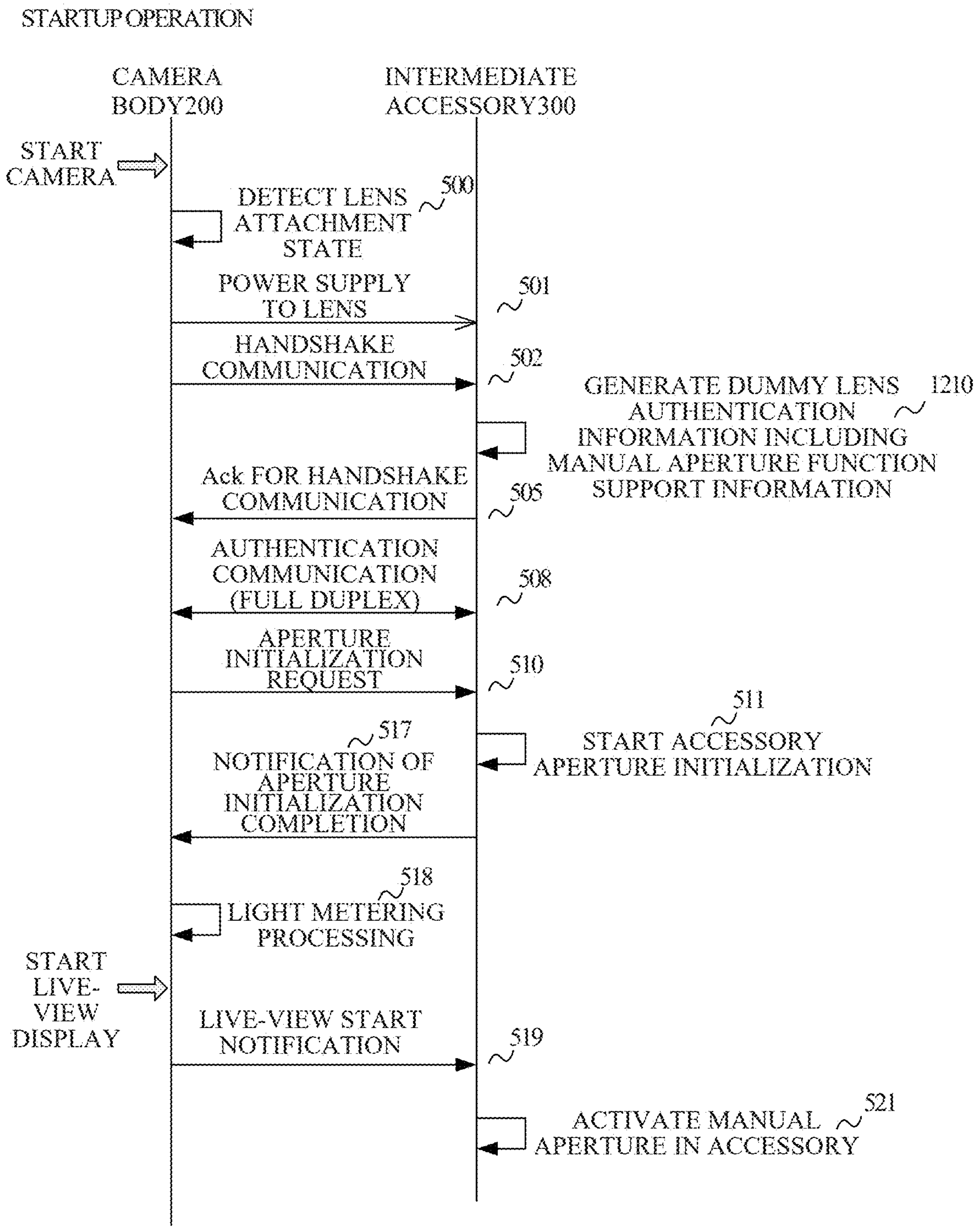
FIG. 13A explains the startup sequence according to the fifth embodiment.

Referring now to FIG. 13A, a description will be given of the startup sequence when the power is turned on in a state where the camera body 200, the interchangeable lens 100, and the intermediate accessory 300 are combined. FIG. 13A explains the startup sequence according to this embodiment. As described above, the interchangeable lens 100*b* cannot communicate.

In processing 500, the camera body 200 detects that the intermediate accessory 300 is attached together by the ATTACH signal 2084 in FIG. 2. In processing 501, power for driving the accessory microcomputer 301 and various actuators of the intermediate accessory 300 is supplied from the camera body 200 to the intermediate accessory 300 via the power terminal 2085 in FIG. 2.

In processing 502, handshake communication data to confirm the communication establishment is transmitted from the camera body 200 to the interchangeable lens 100*b*. This communication data is received by the intermediate accessory 300, but communication with the interchangeable lens 100*b* is not available. Therefore, in processing 1210, dummy lens authentication information including supportability of the manual aperture function is generated, and in processing 507, the intermediate accessory 300 responds to the camera body 200 with handshake communication.

In a case where authentication communication is transmitted from the camera body 200 in processing 508, the intermediate accessory 300 responds to the camera body 200 with the lens authentication information generated in processing 1210. In a case where an aperture initialization request is transmitted from the camera body 200 in processing 510, the intermediate accessory 300 performs initialization processing of the accessory aperture unit 303 in processing 511, and responds to the camera body 200 with aperture initialization completion in processing 516. The subsequent processing are similar to those of the first embodiment.

Figure 13B:
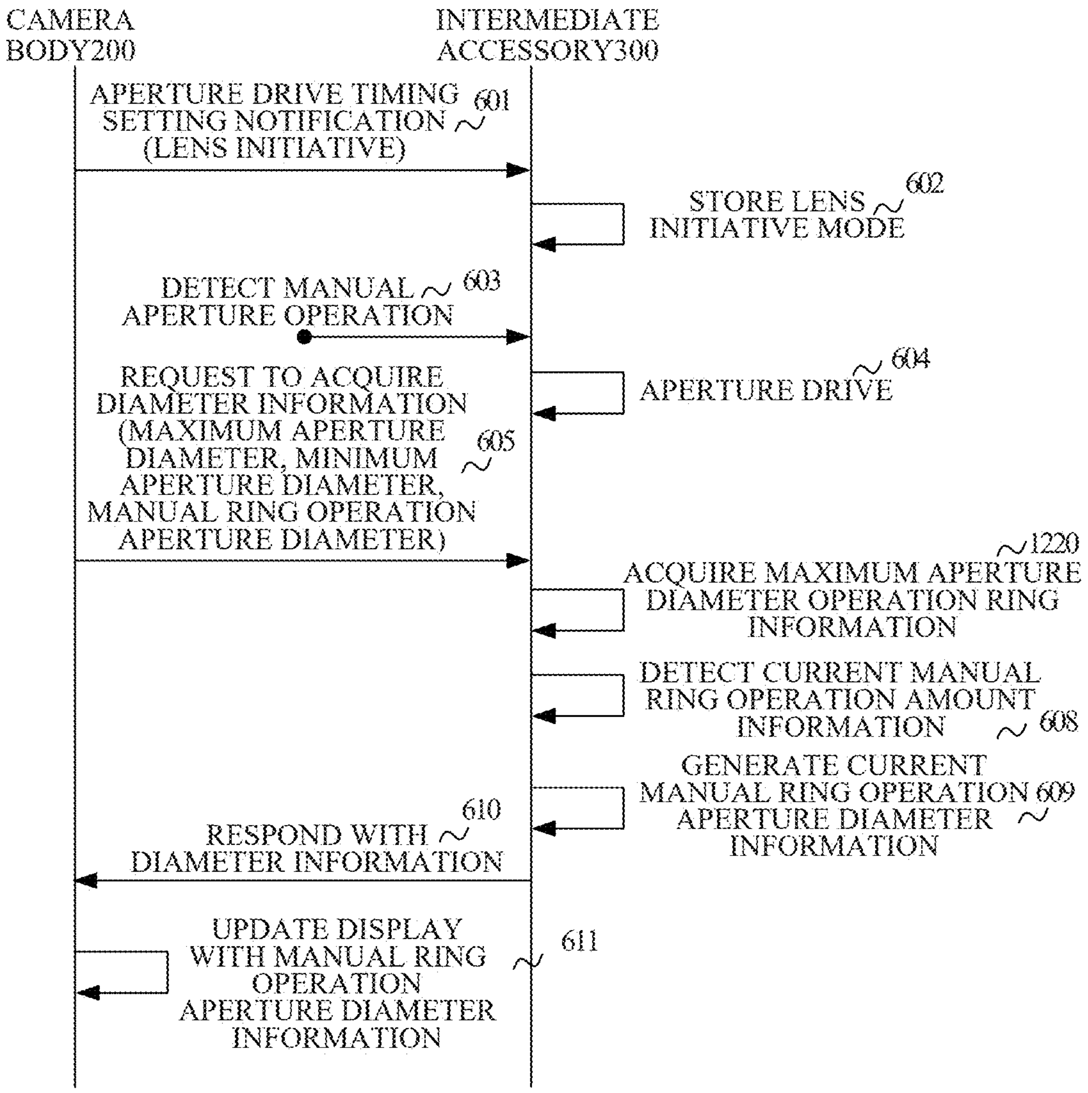
FIG. 13B explains an operation in a moving image recording mode according to the fifth embodiment.
Figure 13C:
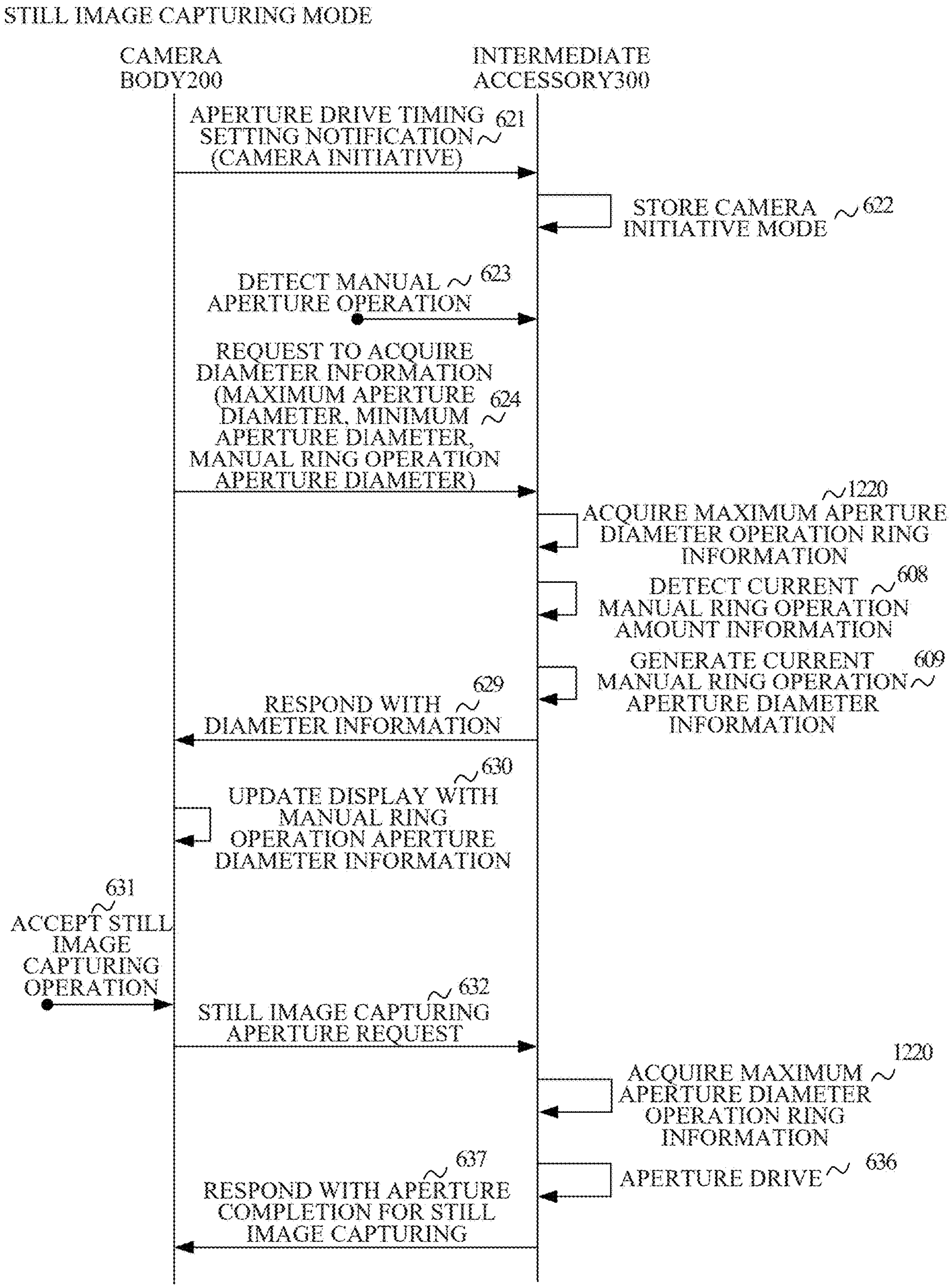
FIG. 13C explains an operation in a still image recording mode according to the fifth embodiment.

Referring now to FIGS. 13B and 13C, a description will be given of the operation in the moving image capturing mode (in and after processing 601) and the still image capturing mode (in and after processing 621). FIG. 13B explains the operation in the moving image capturing mode. FIG. 13C explains the operation in the still image capturing mode.

Example of Moving Image Capturing Mode

Processing 601 to processing 605 are similar to those of the first embodiment, and the intermediate accessory 300 stores the "lens initiative" setting notification from the camera body 200, and drives the accessory aperture unit 303 when a manual ring operation is detected.

In a case where a request to acquire aperture diameter information is transmitted from the camera body in processing 605, in this embodiment, the intermediate accessory 300 acquires a set value of the maximum aperture diameter information by the user operation in processing 1220. More specifically, by operating the operation ring 1201, the setting information when it is set by the user as the maximum aperture diameter of the currently attached interchangeable lens 100*b* is acquired. In processing 609, the intermediate accessory 300 generates current manual ring operation maximum aperture diameter information using the user-set maximum aperture diameter information and the current aperture adjusting amount of the accessory aperture unit 303 acquired in processing 608. The minimum aperture diameter information can be calculated from the maximum aperture diameter information and the aperture adjustable amount that the accessory aperture unit 303 can be mechanically adjusted. In processing 610, the diameter information generated in processing 609 is responded to the camera body 200, and that information is displayed on the display unit 206 in processing 611.

Example of Still Image Capturing Mode

Processing 621 to processing 623 are similar to those of the first embodiment, and the "camera initiative" setting notification from the camera body is stored and manual ring operation is detected. As described above, the "camera initiative" setting is stored, so the intermediate accessory 300 does not control the accessory aperture unit 303 at this timing.

In a case where a request to acquire diameter information on the aperture unit 114 is transmitted from the camera body 200 in processing 624, in this embodiment, the set value of the maximum aperture diameter information set by the user is acquired in processing 1220. This processing is similar to that described in the moving image capturing mode. The intermediate accessory 300 generates current manual ring operation aperture diameter information in processing 609 using the maximum aperture diameter information set by the user and the current aperture adjusting amount of the accessory aperture unit 303 acquired in processing 608. In processing 629, the intermediate accessory 300 responds to the camera body 200 with the diameter information generated in processing 609. In processing 630, the camera body 200 displays that information on the display unit 206.

In processing 631, in a case where a still image capturing operation for still image capturing is accepted by the operation unit 207 of the camera body 200, an aperture drive command specifying aperture diameter information for still image capturing is transmitted from the camera body 200 in processing 632. At this time, the intermediate accessory 300 determines an aperture adjusting amount from a difference between the maximum aperture diameter information set by the user and the aperture diameter information for still image capturing. In processing 636, the intermediate accessory 300 controls the accessory aperture unit 303 and responds to the camera body 200 with a completion notification in processing 637.

In this embodiment, in a case where the interchangeable lens 100*b* has no communication terminal, the intermediate accessory 300 can set the maximum aperture diameter information on the interchangeable lens 100*b* by the user operation. Thereby, the intermediate accessory 300 properly transmits diameter information incident on the camera mount during a manual ring operation to the camera body 200, and a camera system having a more accurate manual aperture function than ever can be provided.

In each embodiment, the accessory (intermediate accessory) attached between various interchangeable lenses and the image pickup apparatus has an aperture function. Therefore, even if the interchangeable lens does not have an aperture function or the performance of the aperture unit of the interchangeable lens is insufficient, a highly functional manual aperture function can be provided. In each embodiment, the accessory aperture unit (first aperture unit) can be used without using the aperture unit (second aperture unit) of the interchangeable lens.

Therefore, by properly communicating with the image pickup apparatus or the interchangeable lens, camera control can be realized according to the status of the accessory aperture unit. Hence, each embodiment can provide an accessory, an accessory control method, and a storage medium, each of which can realize proper aperture control in an accessory having an aperture unit.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

This embodiment can provide an accessory having an aperture unit that can achieve proper aperture control.

This application claims priority to Japanese Patent Application No. 2023-184395, which was filed on Oct. 27, 2023, and which is hereby incorporated by reference herein in its entirety.

What is claimed is:

1. An accessory detachably mounted between an interchangeable lens and an image pickup apparatus, the accessory comprising:

a first aperture unit configured to adjust a light amount incident from the interchangeable lens;

a communication unit configured to communicate with each of the interchangeable lens and the image pickup apparatus; and a processor configured to:

control the first aperture unit, and change a communication processing method with the interchangeable lens or the image pickup apparatus according to whether or not received information received via the communication unit is information regarding aperture control.

2. The accessory according to claim 1, wherein the processor is configured to:

determine whether or not the received information received via the communication unit is the information regarding the aperture control, perform, in a case where the received information is not the information regarding the aperture control, first communication processing performed between the accessory and the image pickup apparatus and second communication processing performed between the accessory and the interchangeable lens using the same method, and perform, in a case where the received information is the information regarding the aperture control, the first communication processing and the second communication processing using different methods.

3. The accessory according to claim 1, wherein the processor is configured to:

transmit the received information received from one of the image pickup apparatus and the interchangeable lens as it is, in a case where the received information is not the information regarding the aperture control, to the other of the image pickup apparatus and the interchangeable lens, and edit the received information in a case where the received information is the information regarding the aperture control.

4. The accessory according to claim 1, wherein the processor is configured to communicate, in a case where the processor receives an aperture initialization request from the image pickup apparatus via the communication unit, the aperture initialization request to the interchangeable lens and initialize the first aperture unit.

5. The accessory according to claim 1, wherein the processor is configured to activate an operation of the first aperture unit after initialization of a second aperture unit of the interchangeable lens is completed.

6. The accessory according to claim 1, wherein the processor is configured to activate an operation of the first aperture unit after power supply from the image pickup apparatus to the interchangeable lens is started.

7. The accessory according to claim 1, wherein the processor is configured to determine whether power supplied from the image pickup apparatus to the interchangeable lens is equal to or larger than a predetermined threshold, drive, in a case where the power is equal to or larger than the predetermined threshold, the first aperture unit while a second aperture unit of the interchangeable lens is being driven, and not drive, in a case where the power is smaller than the predetermined threshold, the first aperture unit while the second aperture unit is being driven.

8. The accessory according to claim 1, wherein the processor is configured to:

not drive the first aperture unit in a case where the image pickup apparatus communicates a power saving request to the interchangeable lens through the communication unit, or in a case where no communication is made for a predetermined period, and start driving the first aperture unit according to a subsequent communication from the image pickup apparatus.

9. The accessory according to claim 1, wherein the processor is configured to add, in a case where the processor acquires authentication information on the interchangeable lens from the interchangeable lens through the communication unit, information indicating that the interchangeable lens supports a manual aperture function to the authentication information, and transmit added information to the image pickup apparatus.

10. The accessory according to claim 1, wherein the processor is configured to:

transmit to the image pickup apparatus, in a case where diameter information on a light beam incident on a mount portion is requested by the image pickup apparatus, diameter information generated based on at least one of interchangeable lens diameter information acquired from the interchangeable lens via the communication unit and information regarding an aperture adjusting amount of the first aperture unit, and transmit, in a case where a drive state of the first aperture unit is requested by the image pickup apparatus, the drive state to the image pickup apparatus.

11. The accessory according to claim 1, wherein the processor is configured to:

acquire from the interchangeable lens, in a case where maximum aperture diameter information is requested by the image pickup apparatus, the maximum aperture diameter information when a second aperture unit is set to a maximum aperture state, and transmit the maximum aperture diameter information to the image pickup apparatus, acquire, in a case where minimum aperture diameter information for minimizing an aperture is requested by the image pickup apparatus, the minimum aperture diameter information using the maximum aperture diameter information and an aperture adjusting amount of the first aperture unit, and transmit the minimum aperture diameter information to the image pickup apparatus, and acquire, in a case where manual aperture diameter information by a manual ring operation is requested by the image pickup apparatus, the manual aperture diameter information using the maximum aperture diameter information and a current aperture adjusting amount of the first aperture unit, and transmit the manual aperture diameter information to the image pickup apparatus.

12. The accessory according to claim 1, wherein the processor is configured to acquire, in a case where any one of maximum aperture diameter information, minimum aperture diameter information, and manual aperture diameter information is requested by the image pickup apparatus, the manual aperture diameter information using the maximum aperture diameter information acquired from the interchangeable lens via the communication unit and a current aperture adjusting amount of the first aperture unit, and transmit the manual aperture diameter information to the image pickup apparatus.

13. The accessory according to claim 1, wherein the processor is configured to switch a response to a request for information on an aperture diameter requested by the image pickup apparatus based on information on whether or not the image pickup apparatus supports control of the interchangeable lens having a manual aperture function.

14. The accessory according to claim 1, wherein the processor is configured to:

control the first aperture unit based on user operation information that is used to control the first aperture unit, rather than on an aperture control request from the image pickup apparatus, and not transmit the aperture control request to the interchangeable lens.

15. The accessory according to claim 1, wherein the processor is configured to:

control the first aperture unit based on an aperture control request from the image pickup apparatus even if the processor acquires user operation information that is used to control the first aperture unit, and not transmit the aperture control request to the interchangeable lens.

16. The accessory according to claim 1, wherein the processor is configured to:

acquire setting information for an aperture drive method from the image pickup apparatus via the communication unit, and switch the aperture drive method based on the setting information.

17. The accessory according to claim 1, wherein the processor is configured to transmit information for deactivating manual aperture diameter function to the interchangeable lens, in a case where authentication information on the interchangeable lens includes information indicating that the interchangeable lens supports a manual aperture function.

18. The accessory according to claim 1, wherein the processor is configured to:

determine whether or not authentication information on the interchangeable lens includes information indicating that the interchangeable lens supports a manual aperture function, control the first aperture unit by setting a second aperture unit of the interchangeable lens to a maximum aperture state, in a case where the interchangeable lens having the manual aperture function is attached and user operation information that is used to control the first aperture unit is acquired, and control the first aperture unit to a maximum aperture state, in a case where the processor detects, via the communication unit, that the manual aperture function of the interchangeable lens has been executed.

19. The accessory according to claim 1, wherein the processor is configured to switch a response to a request for information on an aperture diameter from the image pickup apparatus based on information on whether or not the image pickup apparatus supports control of the interchangeable lens having a manual aperture function.

20. A control method for an accessory detachably attached between an interchangeable lens and an image pickup apparatus, the control method comprising:

a communication step of communicating with each of the interchangeable lens and the image pickup apparatus via a communication unit; and a control step of controlling a first aperture unit configured to adjust a light amount of incident light from the interchangeable lens, wherein the communication step changes a communication processing method with the interchangeable lens or the image pickup apparatus according to whether received information received via the communication unit is information regarding aperture control.

* * * * *